United States Patent
Karabacak et al.

(10) Patent No.: US 11,779,862 B2
(45) Date of Patent: Oct. 10, 2023

(54) COMPOSITE FOR OIL-WATER SEPARATION, SYNTHESIS METHODS AND APPLICATIONS OF SAME

(71) Applicant: BOARD OF TRUSTEES OF THE UNIVERSITY OF ARKANSAS, Little Rock, AR (US)

(72) Inventors: Tansel Karabacak, Little Rock, AR (US); Nawzat Saeed Saadi, Little Rock, AR (US); Laylan Bapper Hassan, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 107 days.

(21) Appl. No.: 17/237,307

(22) Filed: Apr. 22, 2021

(65) Prior Publication Data

US 2021/0236958 A1 Aug. 5, 2021

Related U.S. Application Data

(62) Division of application No. 15/904,994, filed on Feb. 26, 2018, now Pat. No. 11,014,020.

(Continued)

(51) Int. Cl.
| | |
|---|---|
| B01D 17/02 | (2006.01) |
| B01D 15/14 | (2006.01) |
| C02F 1/28 | (2023.01) |
| B01J 20/28 | (2006.01) |
| B01J 20/30 | (2006.01) |
| B01J 20/02 | (2006.01) |

(Continued)

(52) U.S. Cl.
CPC ......... *B01D 17/0202* (2013.01); *B01D 15/14* (2013.01); *B01D 17/10* (2013.01); *B01J 20/02* (2013.01); *B01J 20/26* (2013.01); *B01J 20/28016* (2013.01); *B01J 20/3078* (2013.01); *B01J 20/3268* (2013.01); *C02F 1/288* (2013.01); *C02F 1/281* (2013.01); *C02F 1/285* (2013.01); *C02F 2101/32* (2013.01); *C02F 2103/007* (2013.01); *C02F 2303/16* (2013.01)

(58) Field of Classification Search
CPC .... B01D 17/0202; B01D 15/14; B01D 17/10; B01J 20/02; B01J 20/26; B01J 20/28016; B01J 20/3078; B01J 20/3268; C02F 1/288; C02F 1/281; C02F 1/285; C02F 2101/32; C02F 2103/007; C02F 2303/16
See application file for complete search history.

(56) References Cited

PUBLICATIONS

Kong et al, "Superhydrophobic Cuprous Oxide Nanostructures on Phosphor-Copper Meshes and Their Oil-Water Separation and Oil Spill Cleanup," ACS Appl. Mater. Interfaces 2015, 7, 2616-2625.*

(Continued)

*Primary Examiner* — Krishnan S Menon
(74) *Attorney, Agent, or Firm* — Locke Lord LLP; Tim Tingkang Xia, Esq.

(57) ABSTRACT

Certain aspects of the invention relate to a method of synthesizing a composite usably for oil-water separation comprising surface nanostructuring a pristine powder or porous material to form a nanostructured powder or porous material having surfaces with nanoscale features; and coating single or multilayers of one or more low surface energy oligomers, polymers, or their composites with other materials on the surfaces of the nanostructured powder or porous material.

13 Claims, 18 Drawing Sheets

Related U.S. Application Data

(60) Provisional application No. 62/463,207, filed on Feb. 24, 2017.

(51) Int. Cl.
*B01J 20/26* (2006.01)
*B01J 20/32* (2006.01)
*B01D 17/00* (2006.01)
*C02F 103/00* (2006.01)
*C02F 101/32* (2006.01)

(56) References Cited

PUBLICATIONS

Song, "Simple and fast fabrication of superhydrophobic metal wire mesh for efficiently gravity driven oi/water separation," Marine Pollution Bulletin 113 (2016) 211-215.*
Lin et al, "Superhydrophobic Functionalized Graphene Aerogels", ACS Appl. Mater. Interfaces 2011, 3, 2200-2203 (Year: 2011).*

* cited by examiner

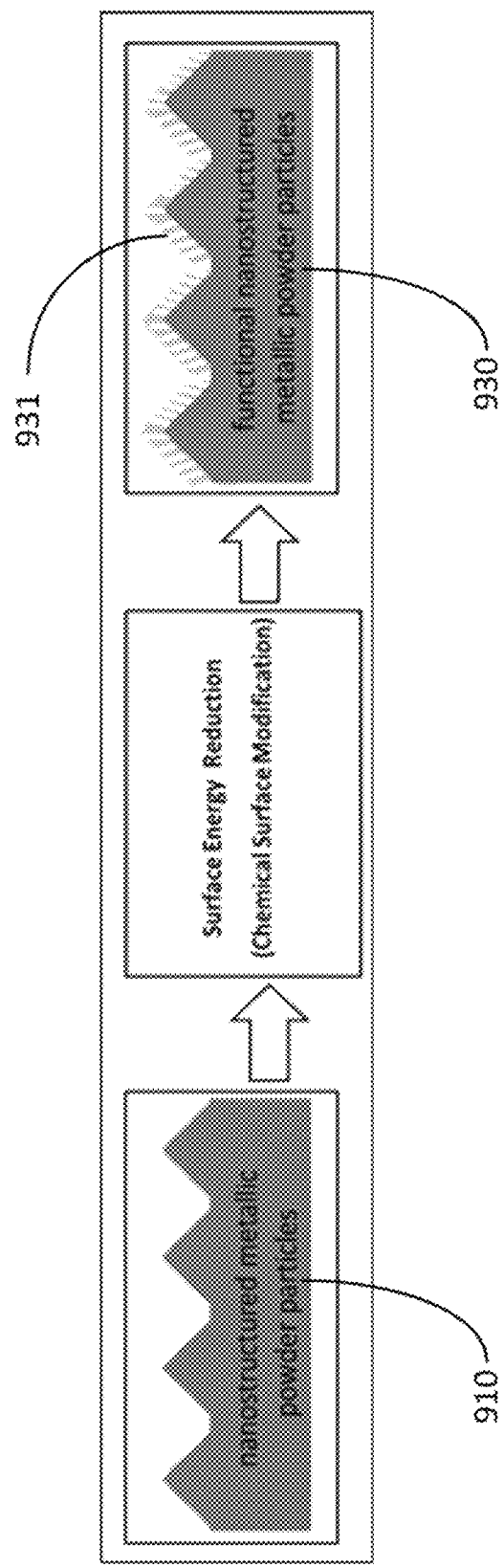

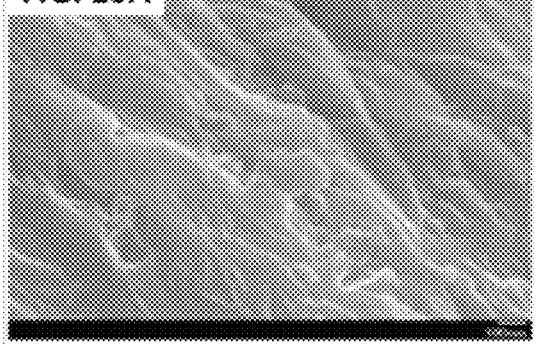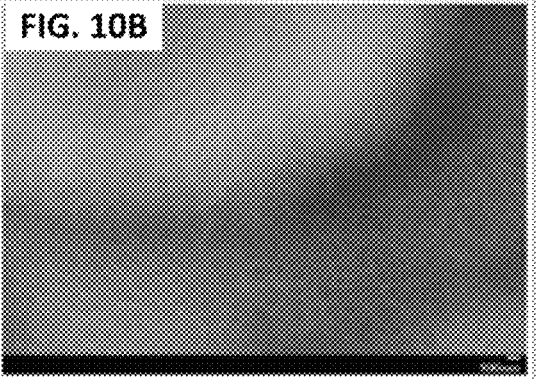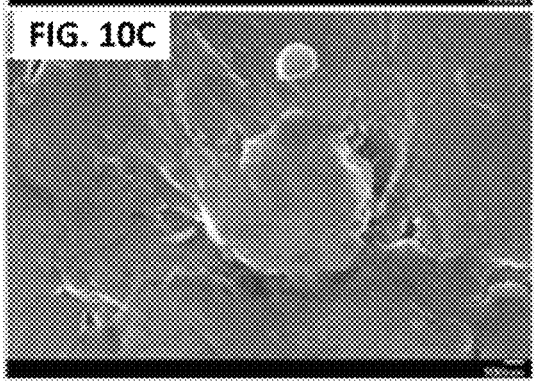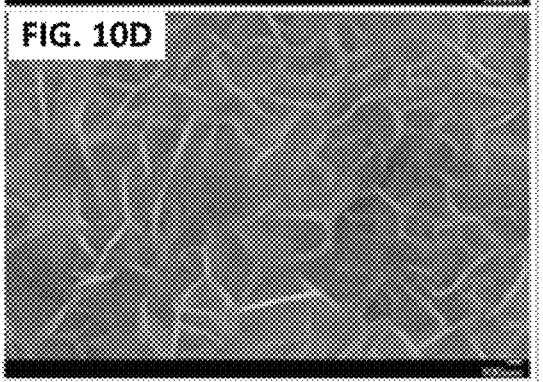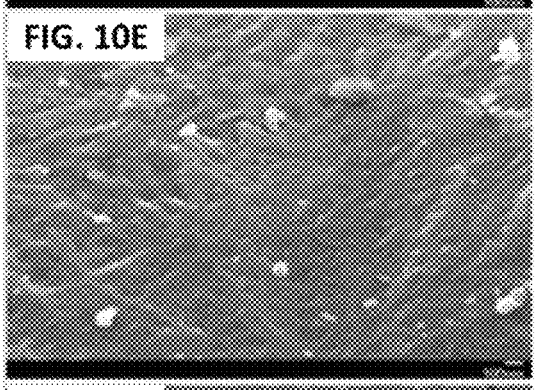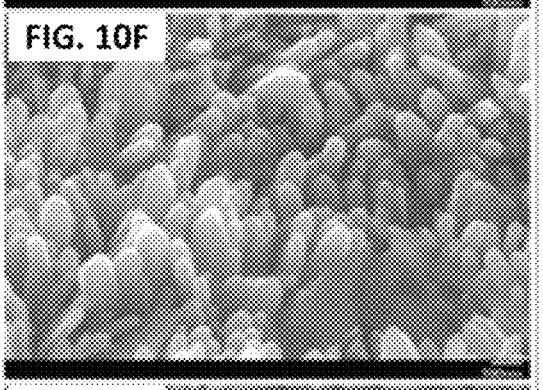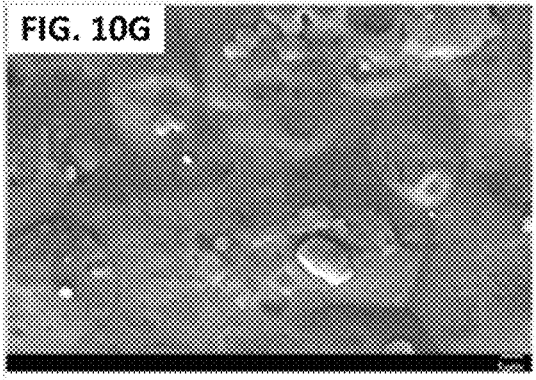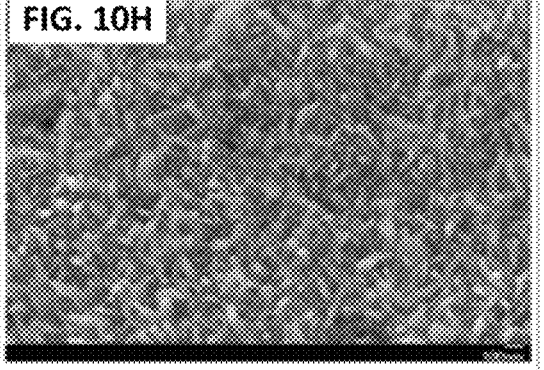

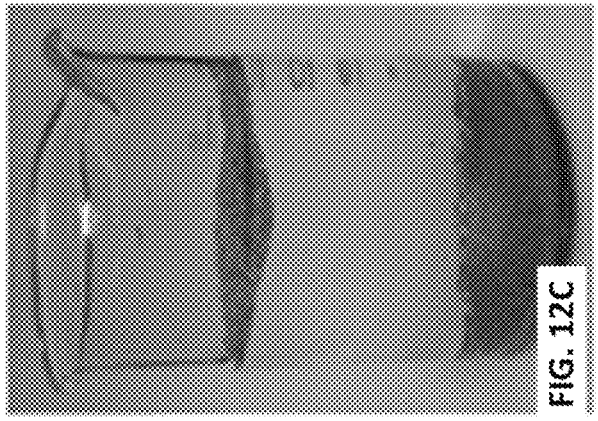
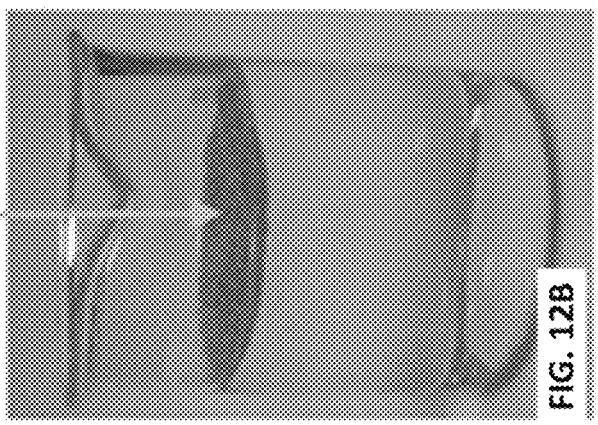
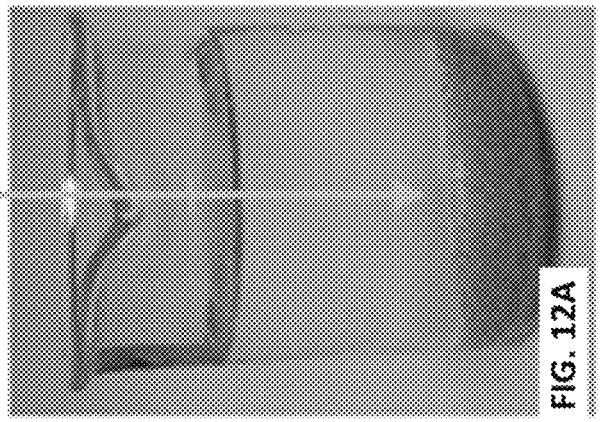
FIG. 12A HWT-Al powder Superhydrophilic
FIG. 12B Functional HWT-Al powder Superhydrophobic
FIG. 12C Superhydrophobic & Superhydrophilic Al powder

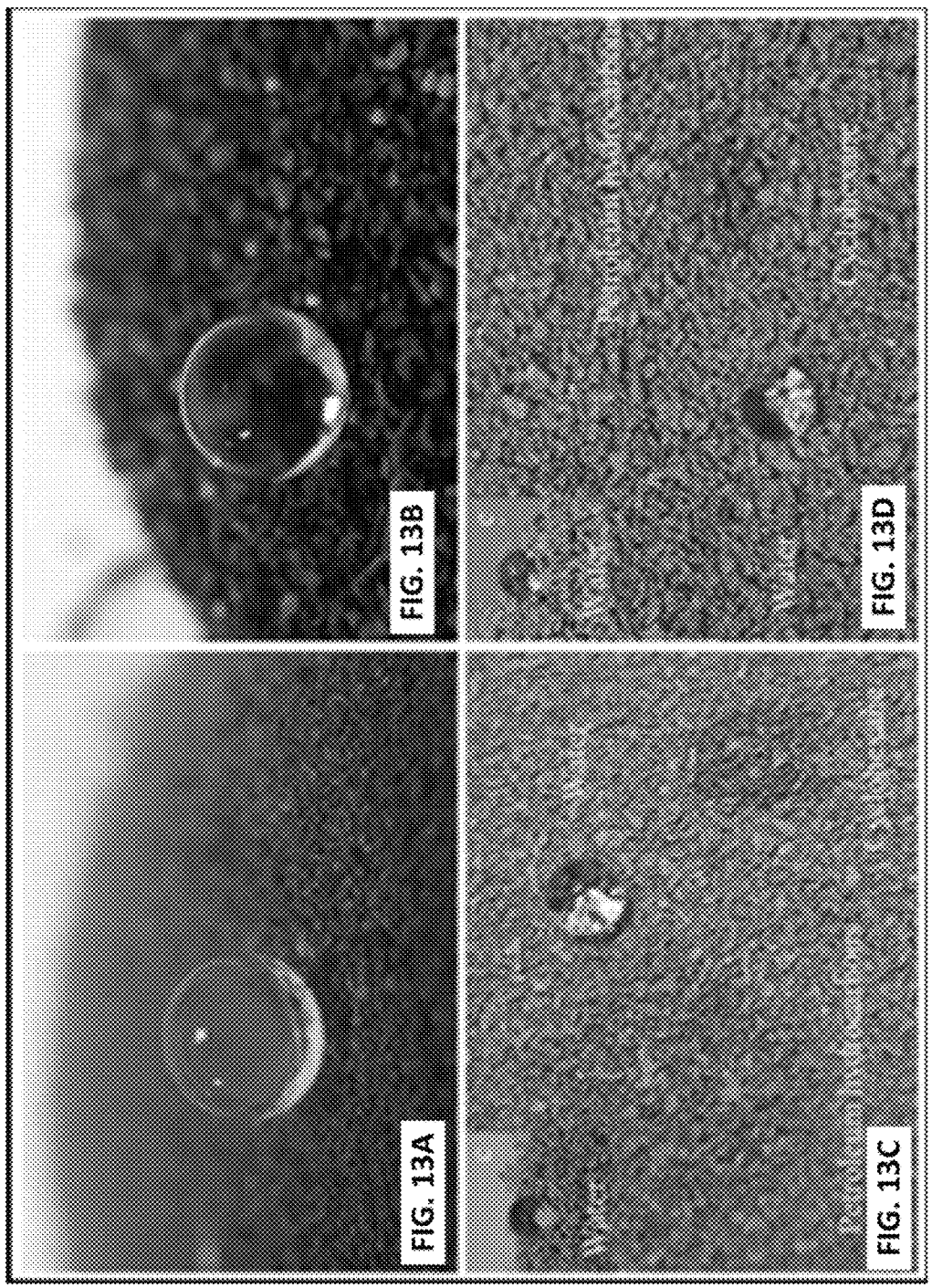

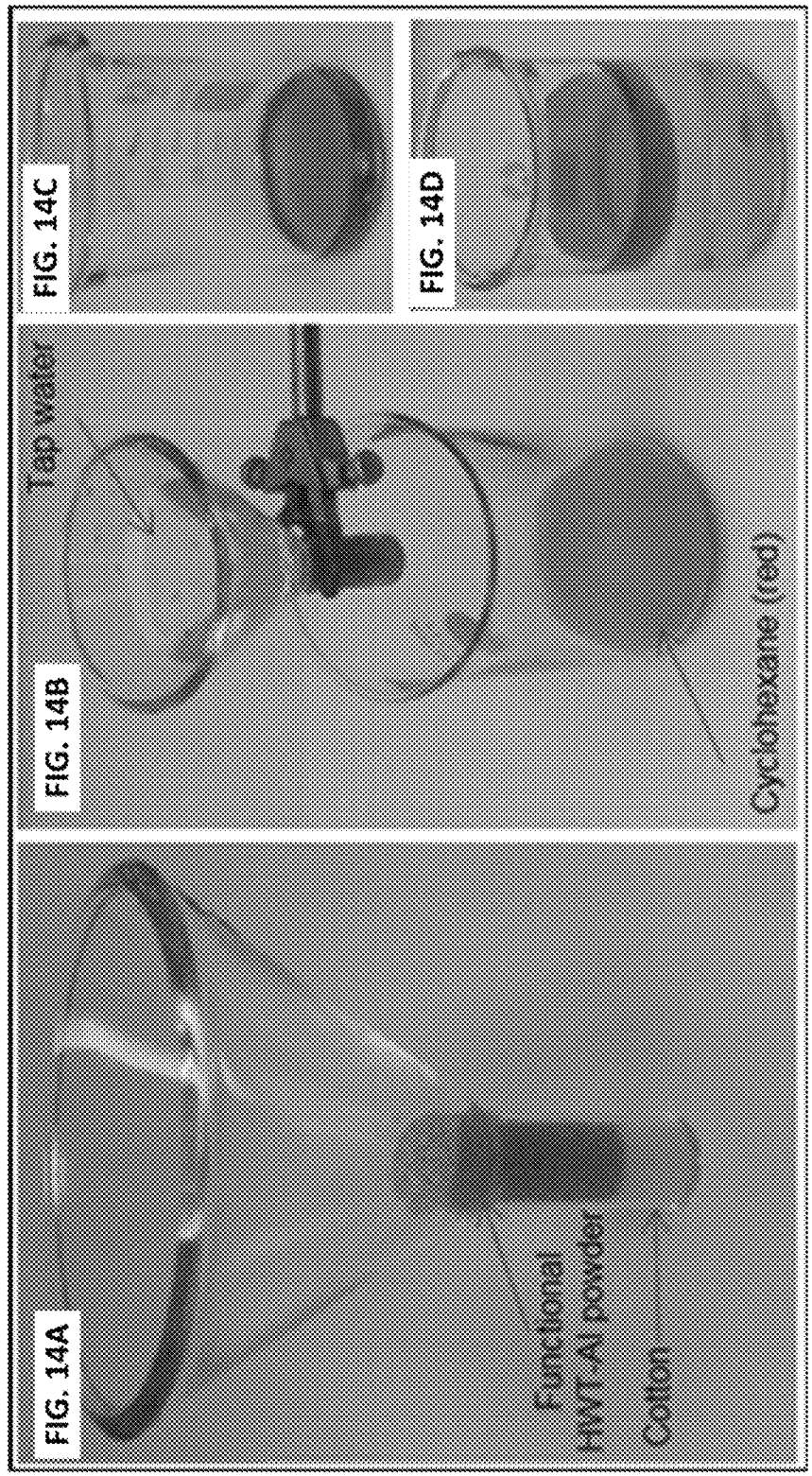

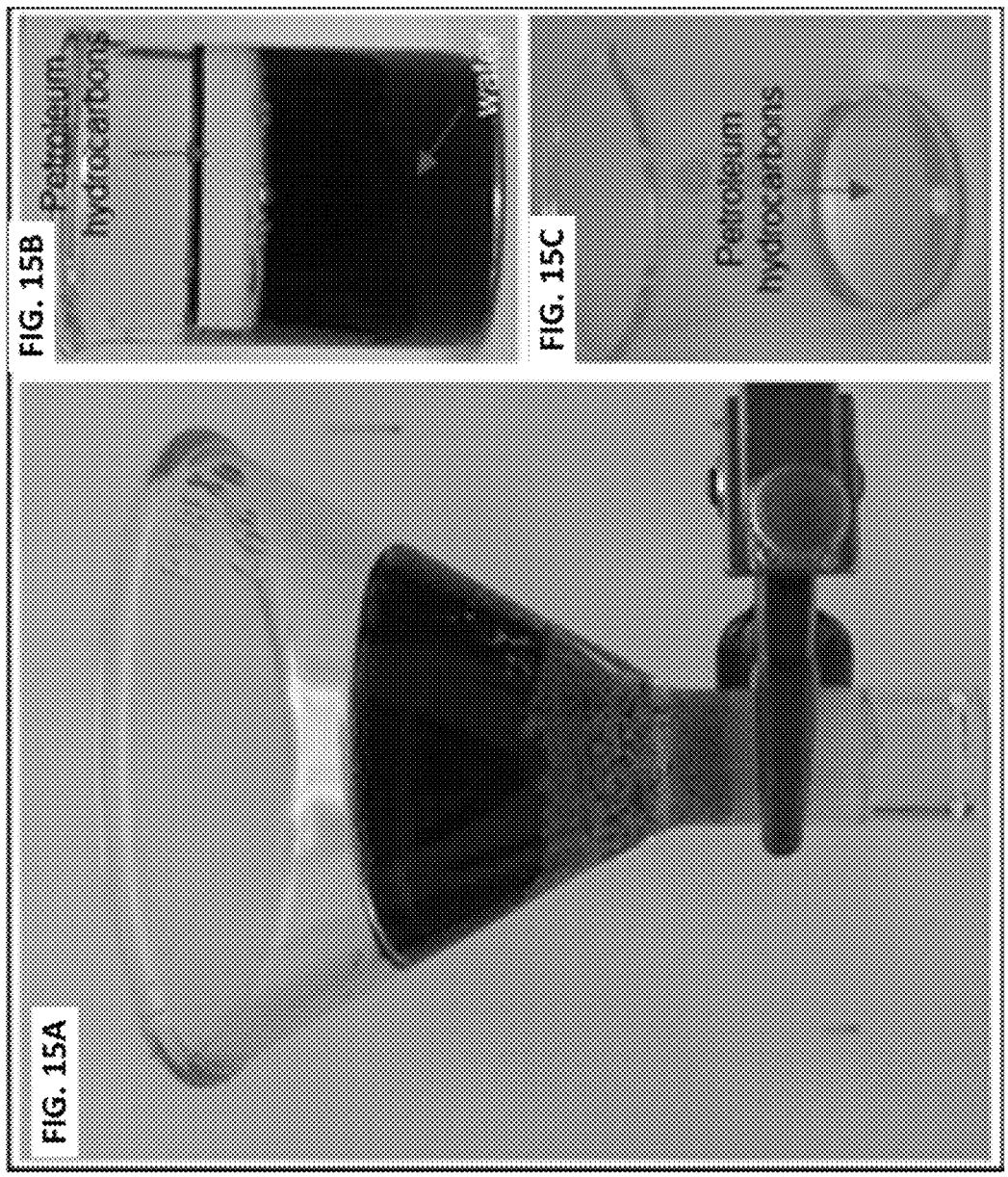

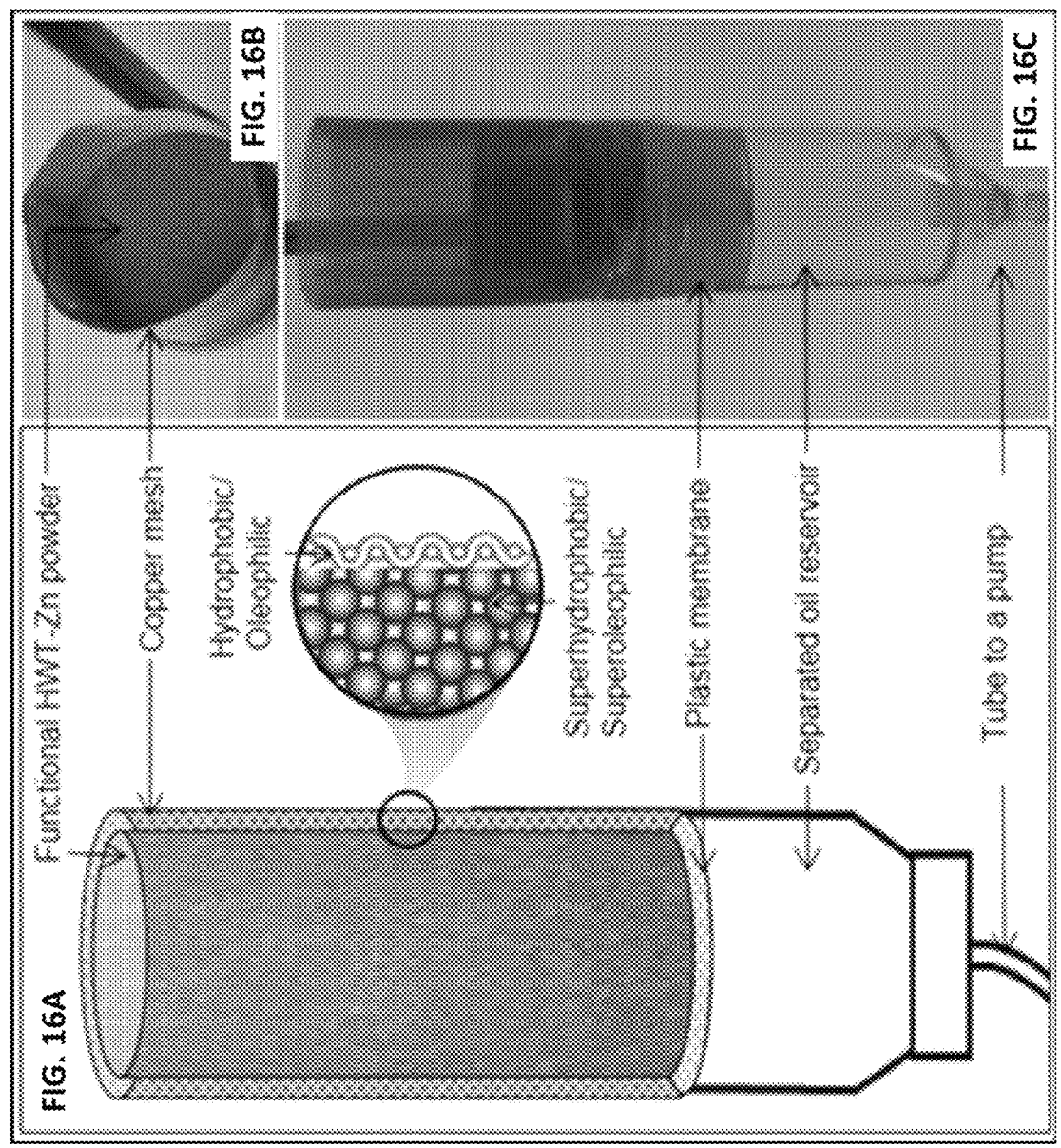

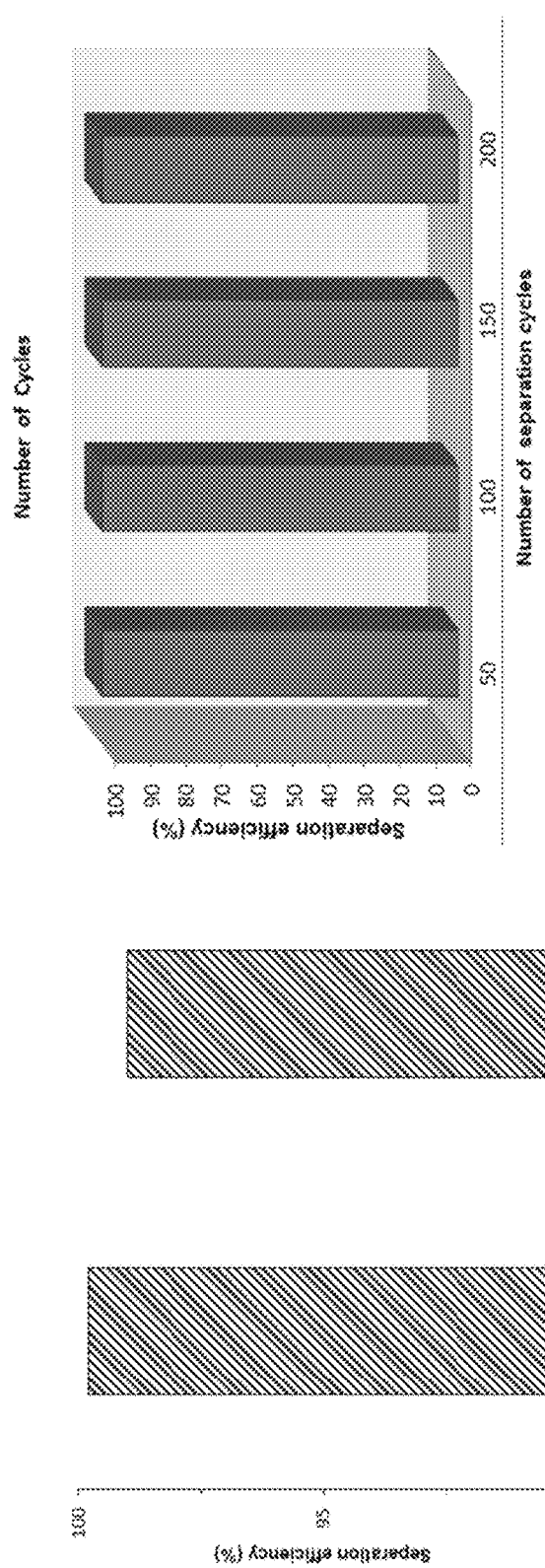
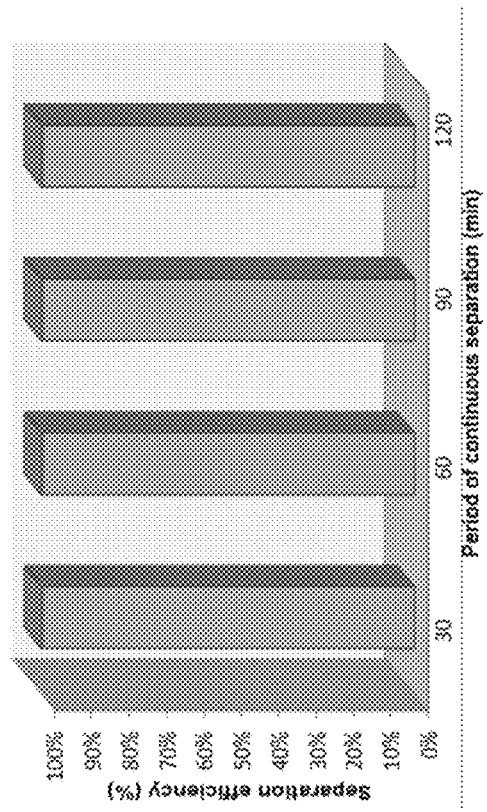
FIG. 18A
FIG. 18B
FIG. 18C

COMPOSITE FOR OIL-WATER SEPARATION, SYNTHESIS METHODS AND APPLICATIONS OF SAME

CROSS-REFERENCE TO RELATED PATENT APPLICATION

This application is a divisional application of, and claims benefit of U.S. patent application Ser. No. 15/904,994, filed Feb. 26, 2018, now allowed, which itself claims priority to and the benefit of U.S. provisional patent application Ser. No. 62/463,207, filed Feb. 24, 2017, which are incorporated herein by reference in their entireties.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference is individually incorporated by reference. In terms of notation, hereinafter, [n] represents the nth reference cited in the reference list. For example, [1] represents the first reference cited in the reference list, namely, Song, B., Simple and fast fabrication of superhydrophobic metal wire mesh for efficiently gravity-driven oil/water separation. Marine Pollution Bulletin, 2016. 113(1-2): p. 211-215.

FIELD

The present disclosure relates generally to oil-water separation, and more particularly to a composite for oil-water separation, synthesis methods and applications of the same.

BACKGROUND

The background description provided herein is for the purpose of generally presenting the context of the present disclosure. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present disclosure.

When oil spills into water during its offshore production, marine transport and petrochemicals production, toxic chemicals can be released to water and cause pollution, which has become a global problem as it causes substantial environmental concerns. Oils can also contaminate land water or cause cleaning challenges when spilled over fabric materials. Traditional oil-removal methods, which are based on specific gravity of liquids, such as skimming, air floatation, and membrane filtration have been widely used to remove oils from water. Because of the high cost of operation and low-efficiency of traditional separation methods, materials with special wettability, materials that can repel water (hydrophobic or super-hydrophobic) and absorb oils (oleophilic or super-oleophilic), or materials that can repel oils (oleophobic or super-oleophobic) and absorb water (hydrophilic or super-hydrophilic), have been used to clean polluted water (oily water) with high separation efficiency. Surface modification, the combination of physics and chemistry working together to modify materials to enhance surface properties, is a key feature in fabricating materials with special wettability.

Several 3D porous materials have been used to produce materials with special wettability [1-4] for oil-water separation purposes including, mesh, foams, sponges, powders, membranes [5-9]. In general, numerous nano-structuring methods have been used to integrate powder or porous materials surface with nanostructures to get the essential surface morphology (nanostructured) for materials to own special wettability after surface energy reduction. Some well-known examples of fabrication techniques include chemical vapor deposition (CVD), nano-imprinting, solvent thermal synthesis, nano-lithography, nano-casting, plasma etching, and wet etching. Most of these nano-structuring methods are un-scalable, complicated, high-cost, and environmentally hazardous.

Therefore, a heretofore unaddressed need exists in the art to address the aforementioned deficiencies and inadequacies.

SUMMARY

In one aspect, the invention relates to a composite usably for oil-water separation. In one embodiment, the composite includes a nanostructured powder or porous material having surfaces with nanoscale features, formed from a pristine powder or porous material by a surface nanostructuring process; and single or multilayers of one or more low surface energy oligomers, polymers, or their composites with other materials coated on the surfaces of the nanostructured powder or porous material.

In one embodiment, the pristine powder or porous material comprises a metal, an alloy, a metal oxide, a compound of metals with non-metallic materials, a non-metallic material, an insulator, a conductor, a semiconductor, or a combination thereof.

In one embodiment, the one or more low surface energy oligomers, polymers, or their composites with other materials have surface energies lower than that of water and higher than that of oil. In one embodiment, the composite is hydrophobic (or superhydrophobic) and oleophilic (or superoleophilic) operably repelling water and absorbing oil.

In one embodiment, the one or more low surface energy oligomers, polymers, or their composites with other materials have surface energies lower than that of oil and higher than that of water. In one embodiment, the composite is oleophobic (or superoleophobic) and hydrophilic (or super-hydrophilic) operably repelling oil and absorbing water.

In one embodiment, the surface nanostructuring process comprises a hot water treatment (HWT) or steam treatment (ST) of the pristine powder or porous material.

In one embodiment, the single or multilayers of the low surface energy oligomer or polymer are coated on the surfaces of the nanostructured powder or porous material by a surface energy reduction process including solution immersion and oven evaporation.

In one embodiment, the single or multilayers of the low surface energy oligomer or polymer are coated on the surfaces of the nanostructured powder or porous material by chemical vapor deposition (CVD), physical vapor deposition (PVD), pulsed laser deposition, evaporative deposition, sputter deposition, aerosol-assisted CVD, plasma enhanced CVD (PECVD), atomic layer deposition (ALD), spray coating, paintbrush, or spin coating.

In another aspect, the invention relates to a method of synthesizing a composite usably for oil-water separation. In one embodiment, the method includes surface nanostructuring a pristine powder or porous material to form a nanostructured powder or porous material having surfaces with nanoscale features; and coating single or multilayers of one or more low surface energy oligomers, polymers, or their composites with other materials on the surfaces of the nanostructured powder or porous material.

In one embodiment, the pristine powder or porous material comprises a metal, an alloy, a metal oxide, a compound of metals with non-metallic materials, a non-metallic material, an insulator, a conductor, a semiconductor, or a combination thereof.

In one embodiment, the one or more low surface energy oligomers, polymers, or their composites with other materials have surface energies lower than that of water and higher than that of oil. In one embodiment, the composite is hydrophobic (or superhydrophobic) and oleophilic (or superoleophilic) operably repelling water and absorbing oil.

In one embodiment, the one or more low surface energy oligomers, polymers, or their composites with other materials have surface energies lower than that of oil and higher than that of water. In one embodiment, the composite is oleophobic (or superoleophobic) and hydrophilic (or superhydrophilic) operably repelling oil and absorbing water.

In one embodiment, the surface nanostructuring process comprises a hot water treatment (HWT) or steam treatment (ST) of the pristine powder or porous material.

In one embodiment, the HWT comprises mixing the powder or porous material in water to form a mixture thereof and heating the mixture at temperatures higher than room temperature for a period of time to form the nanostructured powder or porous material having the surfaces with nanoscale features.

In one embodiment, the ST comprises treating the powder or porous material with steam for a period of time to form the nanostructured powder or porous material having the surfaces with nanoscale features.

In one embodiment, the HWT or ST is performed with the assistance of microwave, infrared light heating, and/or in a high pressure container.

In one embodiment, the surface nanostructuring process comprises growing the nanoscale features on the surfaces of the pristine powder or porous material through a cross-deposition mechanism during the HWT. In one embodiment, the cross-deposition mechanism comprises placing the pristine powder or porous material of a non-metallic powder or porous material across a metal substrate during HWT, wherein molecules that migrate through water and deposit on the metal substrate to form nanostructures deposit on the neighboring non-metallic powder or porous material and form a layer of HWT-nanostructures.

In one embodiment, the coating process is performed by a surface energy reduction process including solution immersion and oven evaporation.

In one embodiment, the coating process is performed by chemical vapor deposition (CVD), physical vapor deposition (PVD), pulsed laser deposition, evaporative deposition, sputter deposition, aerosol-assisted CVD, plasma enhanced CVD (PECVD), atomic layer deposition (ALD), spray coating, paintbrush, or spin coating.

In one embodiment, the method further includes, prior to the surface nanostructuring process, a pretreatment process to activate the surface of the pristine powder or porous material, wherein the pretreatment process includes acid dipping or plasma exposure.

In a further aspect, the invention relates to a filter usable for oil-water separation. In one embodiment, the filter includes a composite comprising a nanostructured powder or porous material having surfaces with nanoscale features, formed from a pristine powder or porous material by a surface nanostructuring process; and single or multilayers of one or more low surface energy oligomers, polymers, or their composites with other materials coated on the surfaces of the nanostructured powder or porous material.

In one embodiment, the filter further includes a mesh frame holding the composite.

In one embodiment, the pristine powder or porous material comprises a metal, an alloy, a metal oxide, a compound of metals with non-metallic materials, a non-metallic material, an insulator, a conductor, a semiconductor, or a combination thereof.

In one embodiment, the one or more low surface energy oligomers, polymers, or their composites with other materials have surface energies lower than that of water and higher than that of oil. In one embodiment, the composite is hydrophobic (or superhydrophobic) and oleophilic (or superoleophilic) operably repelling water and absorbing oil.

In one embodiment, the one or more low surface energy oligomers, polymers, or their composites with other materials have surface energies lower than that of oil and higher than that of water. In one embodiment, the composite is oleophobic (or superoleophobic) and hydrophilic (or superhydrophilic) operably repelling oil and absorbing water.

In one aspect, the invention relates to an apparatus for oil-water separation. In one embodiment, the apparatus comprises the filter as disclosed above; and a vacuum pump in fluid communication with the filter for continuous oil-water separation.

In one embodiment, the filter is re-cyclically usable.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 2A shows schematically surface nanostructuring by hot water treatment or steam treatment process, according to embodiments of the invention.

FIG. 2 2B shows schematically surface energy reduction using immersion or evaporation process, according to embodiments of the invention.

FIG. 9 shows schematically a surface energy reduction process and nanostructured metallic powder surface by coating nanoscale features with low surface energy polymers, according to one embodiment of the invention.

FIGS. 10A-10H show SEM images of Al (FIGS. 10A-10B), Mg (FIGS. 10C-10D), Zn FIGS. 10E-10F), and Cu (FIGS. 10G-10H) before (left column) and after (right column) after HWT process at 75° C., according to embodiments of the invention. Treatment times were 10, 20, 40 min and 24 hrs for Al, Mg, Zn, and Cu, respectively, in order to form well defined metal oxide nanostructures.

FIGS. 12A-12C show respectively images of pristine HWT-Al powders (superhydrophilic), functional HWT-Al powders (superhydrophobic), and their mixture after pouring the powder on water, according to one embodiment of the invention FIGS. 13A-13B show respectively images of a water droplet on functional HWT-powders of Cu (FIG. 13A) and Mg (FIG. 13B), according to embodiments of the invention.

FIGS. 13C-13D show respectively images of droplets of water, cyclohexane (dyed with oil red O), petroleum hydrocarbons on functional HWT-powders of Zn (FIG. 13C), and Al (FIG. 13D), according to embodiments of the invention.

FIGS. 14A-14D show respectively an oil-water separation filter module (FIG. 14A) and its application in separation of cyclohexane from water (FIGS. 14B-14D), according to one embodiment of the invention. Cyclohexane permeates through while tap water maintains above the separation apparatus after 20 s. FIG. 14C shows oil collected after separation, while FIG. 14D shows oil-water mixture before separation.

FIGS. 15A-15C show respectively an oil-water separation filter module (FIG. 15A) and its application in oil-water separation (FIGS. 14B-14C), according to one embodiment of the invention. FIG. 15B shows oil-water mixture before separation, and FIG. 15C shows oil (petroleum hydrocarbons) collected after separation.

FIGS. 16A-16C show schematically a cartridge filter for continuous oil-water separation, according to one embodiment of the invention. FIG. 16A shows a schematic diagram of the cartridge filter, and FIGS. 16B and 16C shows a top-view and a side-view of the built cartridge filter, respectively.

FIGS. 18A-18C shows respectively oil-water separation efficiency of a functional HWT-Al-powder cartridge filter, separation efficiency of the cartridge filter after several cycles of separation, and separation efficiency of the cartridge filter after long time periods of continuous oil-water separation, according to one embodiment of the invention.

DETAILED DESCRIPTION

Figure 1:
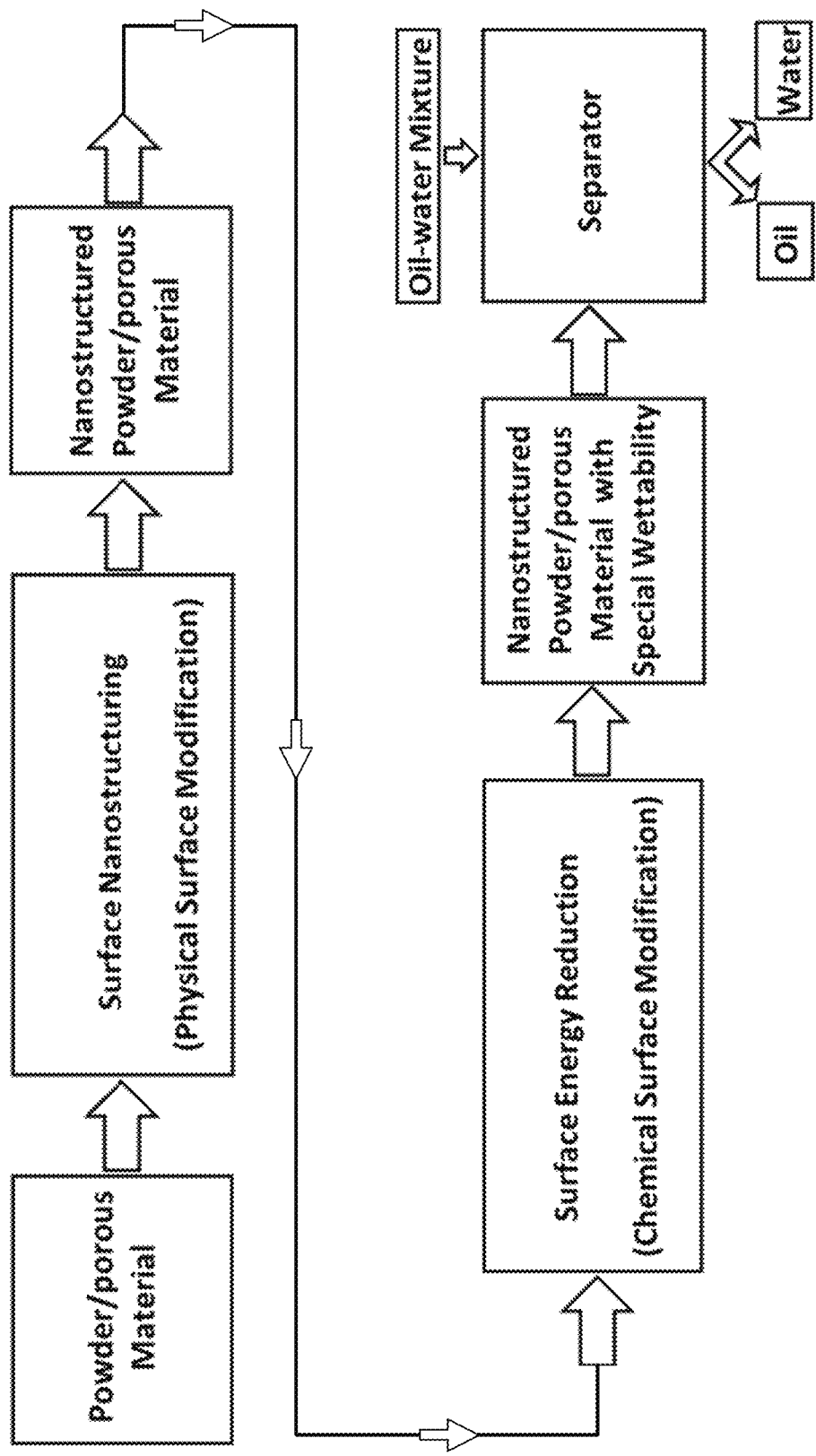
FIG. 1 shows schematically processes of producing a functional nanostructured powder/porous material with special wettability and application of the same, according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more". The word "exemplary" is used herein to mean "serving as an example, instance, or illustration". Any aspect described herein as "exemplary" is not necessarily to be construed as preferred or advantageous over other aspects. Unless specifically stated otherwise, the term "some" refers to one or more. Combinations such as "at least one of A, B, or C", "one or more of A, B, or C", "at least one of A, B, and C", "one or more of A, B, and C", and "A, B, C, or any combination thereof" include any combination of A, B, and/or C, and may include multiples of A, multiples of B, or multiples of C. Specifically, combinations such as "at least one of A, B, or C", "one or more of A, B, or C", "at least one of A, B, and C", "one or more of A, B, and C", and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module", "mechanism", "element", "device" and the like may not be a substitute for the word "means". As such, no claim element is to be construed as a means plus function unless the element is expressly recited using the phrase "means for". It should also be understood that one or more steps within a method may be executed in different order (or concurrently) without altering the principles of the invention.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the disclosure.

Furthermore, relative terms, such as "lower" or "bottom" and "upper" or "top", may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

Typically, terms such as "about," "approximately," "generally," "substantially," and the like unless otherwise indicated mean within 20 percent, preferably within 10 percent, preferably within 5 percent, and even more preferably within 3 percent of a given value or range. Numerical quantities given herein are approximate, meaning that the term "about," "approximately," "generally," or "substantially" can be inferred if not expressly stated.

Typically, "nanoscopic-scale," "nanoscopic," "nanometer-scale," "nanoscale," the "nano-" prefix, and the like refers to elements or articles having widths or diameters of less than about 1 μm, preferably less than about 100 nm in some cases. Specified widths can be smallest width (i.e. a width as specified where, at that location, the article can have a larger width in a different dimension), or largest width (i.e., where, at that location, the article's width is no wider than as specified, but can have a length that is greater), unless pointed out otherwise.

The description is now made as to the embodiments of the invention in conjunction with the accompanying drawings. It should be understood that specific embodiments described herein are merely intended to explain the invention, but not intended to limit the invention. Various modifications to these aspects will be readily apparent to those skilled in the art, and the generic principles defined herein may be applied to other aspects. In accordance with the purposes of this invention, as embodied and broadly described herein, this invention relates to a composite for oil-water separation, synthesis methods and applications of the same.

In certain embodiments, the composite includes a nanostructured powder or porous material having surfaces with nanoscale features, formed from a pristine powder or porous material by a surface nanostructuring process; and single or multilayers of low surface energy oligomers, polymers, or their composites with other materials coated on the surfaces of the nanostructured powder or porous material.

In certain embodiments, the pristine powder or porous material comprises a metal, an alloy, a metal oxide, a compound of metals with non-metallic materials, a non-metallic material, an insulator, a conductor, a semiconductor, or a combination thereof.

In certain embodiments, the low surface energy oligomers, polymers, or their composites with other materials have surface energies lower than that of water and higher than that of oil. In one embodiment, the composite is hydrophobic (or superhydrophobic) and oleophilic (or superoleophilic) operably repelling water and absorbing oil.

In certain embodiments, the low surface energy oligomers, polymers, or their composites with other materials have surface energies lower than that of oil and higher than that of water. In one embodiment, the composite is oleophobic (or superoleophobic) and hydrophilic (or superhydrophilic) operably repelling oil and absorbing water.

In another aspect, the invention relates to a method of synthesizing a composite usably for oil-water separation. In some embodiments, the method includes surface nanostructuring a pristine powder or porous material to form a nanostructured powder or porous material having surfaces with nanoscale features; and coating single or multilayers of a low surface energy oligomer or polymer on the surfaces of the nanostructured powder or porous material.

In some embodiments, the surface nanostructuring process comprises a hot water treatment (HWT) or steam treatment (ST) of the pristine powder or porous material.

In some embodiments, the HWT comprises mixing the powder or porous material in water to form a mixture thereof; and heating the mixture at temperatures higher than room temperature for a period of time to form the nanostructured powder or porous material having the surfaces with nanoscale features.

In some embodiments, the ST comprises treating the powder or porous material with steam for a period of time to form the nanostructured powder or porous material having the surfaces with nanoscale features.

In some embodiments, the HWT or ST is performed with the assistance of microwave, infrared light heating, and/or in a high pressure container.

In some embodiments, the surface nanostructuring process comprises growing the nanoscale features on the surfaces of the pristine powder or porous material through a cross-deposition mechanism during the HWT. In some embodiments, the cross-deposition mechanism comprises placing the pristine powder or porous material of a non-metallic powder or porous material across a metal substrate during HWT, wherein molecules that migrate through water and deposit on the metal substrate to form nanostructures deposit on the neighboring non-metallic powder or porous material and form a layer of HWT-nanostructures.

In some embodiments, the coating process is performed by a surface energy reduction process including solution immersion and oven evaporation.

In some embodiments, the coating process is performed by chemical vapor deposition (CVD), physical vapor deposition (PVD), pulsed laser deposition, evaporative deposition, sputter deposition, aerosol-assisted CVD, plasma enhanced CVD (PECVD), atomic layer deposition (ALD), spray coating, paintbrush, or spin coating.

In some embodiments, the method further includes, prior to the surface nanostructuring process, a pretreatment process to activate the surface of the pristine powder or porous material, wherein the pretreatment process includes acid dipping or plasma exposure.

One aspect of the invention also relates to a new approach of oil-water separation by powder or porous materials with nanostructured metal oxide surface that is synthesized by hot water processes. The overall fabrication and operation of the oil-water separator is low-cost and scalable. In addition, metal oxides also provide stronger adhesion with the surface chemicals and provide superior wetting durability. The fabrication process involves surface nanostructuring by a hot water process followed by a chemical treatment for surface energy reduction. For example, one approach is that metallic powders or foams develop metal oxide nanostructures on their surface after being immersed in hot water or exposed to steam. Then it is coated with a low surface energy self-assembled monolayer (SAM) oligomer or polymer, also by simple methods such as immersion, in order to acquire superhydrophobicity and oleophilicity. If the material comprises micro-scale features, the final morphology achieves a hierarchical micro-nano-roughness that further enhances the wetting properties. Such powder/porous material with special wettability is enclosed within a filter geometry and separate the pumped oil-water mixture. Especially, powder material still retains its wetting properties after being mold into almost any shape, which leads to the design of new filter modules with desired size and shape. Powder-based filters also have the advantage of easy cleaning and re-usability. These make it an easy implementation of such filters to the existing oil-water separation technologies.

In certain embodiments, modified hot water treatment processes are used to coat non-metallic powder/porous materials with metal oxide nanostructures. This allows the applicability of the invention to a wide variety of base powder/porous material types. Furthermore, there are other material geometries and wetting situations that can be used for oil-water separation using the hot water process of this invention.

In certain aspects, the invention relates to powder and porous materials for oil-water separation synthesized by chemical surface modification processes, which reduce the surface energy of a given material. In certain embodiments, the chemical surface modification mainly involves low-surface energy polymer coated on the base material as a self-assembled monolayer. In general, the surface chemistry is essential for a material to acquire special wettability, and usually its surface energy is reduced to sufficiently lower energies compared to a certain liquid and becomes "-phobic" towards that liquid. For example, Teflon has a lower surface energy than water and is hydrophobic. On the contrary, if the surface energy of the material is higher compared to that of the liquid, it becomes "-philic" toward that liquid. As an example, most of the oxide materials have relatively higher surface energies compared to oil and they show an oleophilic behavior. In addition to the surface chemistry, morphology can enhance the wettability of a solid surface. A material can be made to be superhydrophobic from hydrophobic or superhydrophilic from hydrophilic after modifying the surface morphology. An example of the surface morphology effect on its wettability is when a nanostructured layer is formed prior to surface energy reduction. The higher surface area of the nano-rough surface compared to a planar one can improve the wetting behavior of the material, which has been proposed also for oil-water separation applications. Multiscale roughened surfaces (e.g. hierarchically structured) can further enhance the wetting properties, and for example can make a hydrophobic/oleophobic material ultra-hydrophobic or ultra-oleophobic. For oil-water separation purposes, skeletal porous materials, often called "frame", with micro-scale features such as mesh, foam, sponge, and membranes can gain hierarchical surface morphology when a nanostructured layer is introduce on the micro-scale features.

Certain aspects of the invention relates to the fabrication/synthesis of powder or porous materials (metallic and nonmetallic) with special wettability for continuous, high efficiency, and long term oil-water separation at very low fabrication and operation cost. The materials (powder or porous) include surface-nanostructured materials and poses special wettability using a combination of chemical and physical surface modification processes. The surface modification processes used are simple, low-cost, scalable, high-throughput, and eco-friendly, which overcome most of the limitations of conventional surface modification processes.

In certain embodiments, the physical surface modification is based on a low-temperature nanostructure fabrication method and does not require any special environments/steps such as vacuum, acidic/alkaline solutions, or lithographical processing.

In certain embodiments, the chemical surface modification involves a simple immersion process of nanostructured surface into an energy self-assembled monolayer (SAM) oligomer or polymer solution to reduce their surface energy.

In certain embodiments, the resultant materials have different types of special wettability such as the hydrophobicity (or superhydrophobicity) and oleophilicity (or superoleophilicity) (repelling water and absorbing oil), or the oleophobicity or superoleophobicity and hydrophilicity or superhydrophilicity (repelling oil and absorbing water). In certain embodiments, the nanostructuring surface processes form a nanostructured metal oxide layer on a base powder or porous material. The methods are applicable to a wide variety of powder or porous materials including those made of elemental metal, alloy metals, or compound metals or combination of them with other non-metallic powders.

FIG. 1 is a schematic diagram of the approach according to one embodiment of this invention. First, morphology of the base porous/powder material is changed by a hot water process to acquire nanoscale features. Then, it is followed by a chemical surface energy reduction step to achieve special wettability towards water and oil. In certain embodiments, the oil/water separator is made of those materials that are capable to separate oils from water in oil spills or other types of oil polluted water.

Figures 2A, 2B:
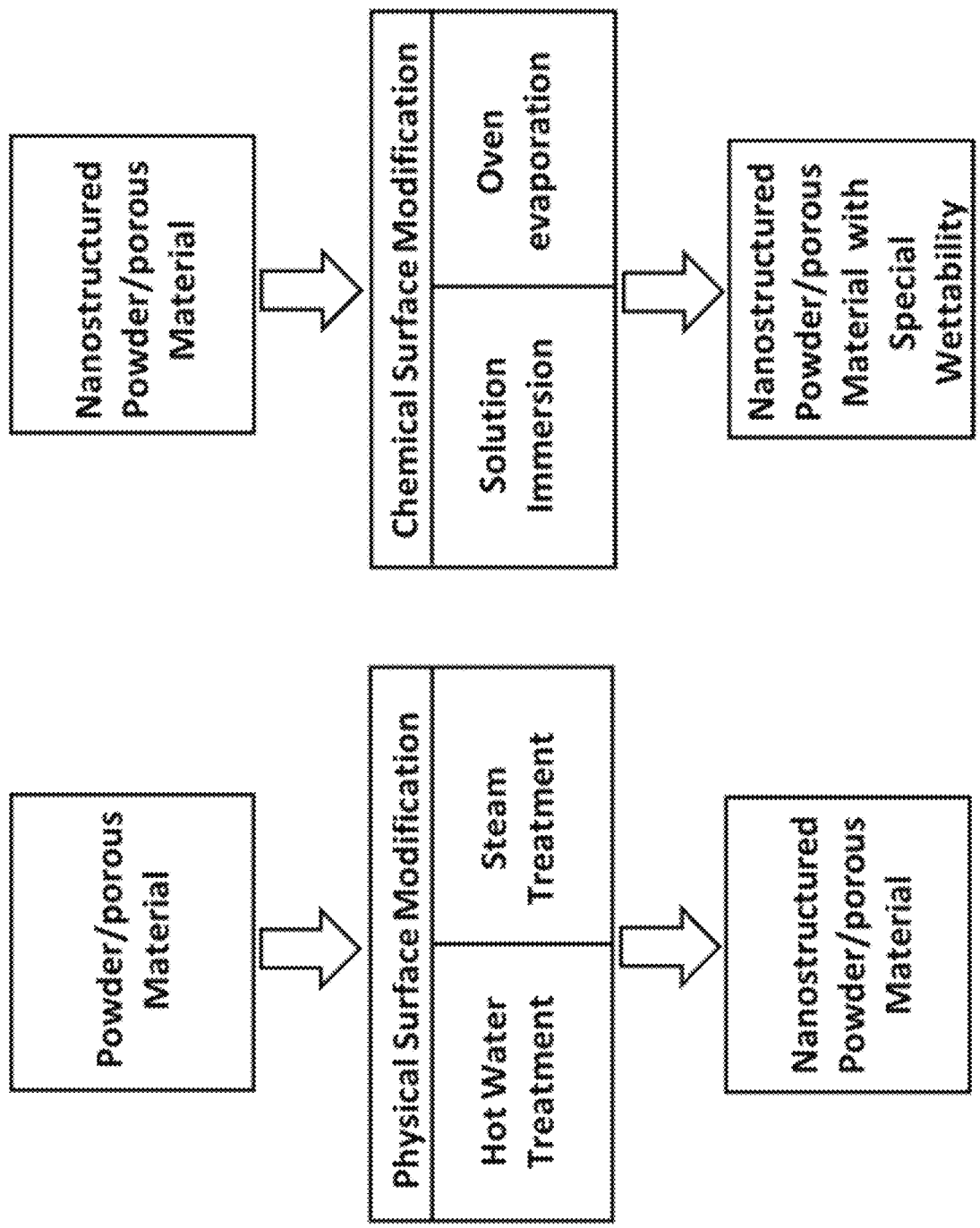

FIGS. 2A and 2B illustrate respectively the physical and chemical surface modification processes according to embodiments of this invention. The surface nanostructuring step, which is a physical surface modification, can be achieved using any of the two simple nanostructure fabrication techniques: hot water treatment or steam treatment. Surface energy reduction step, which is a chemical surface modification, can be achieved either by immersing the nanostructured material in a low-surface-energy solution or evaporating the solution in oven to coat the nanostructured surface.

Figure 3:
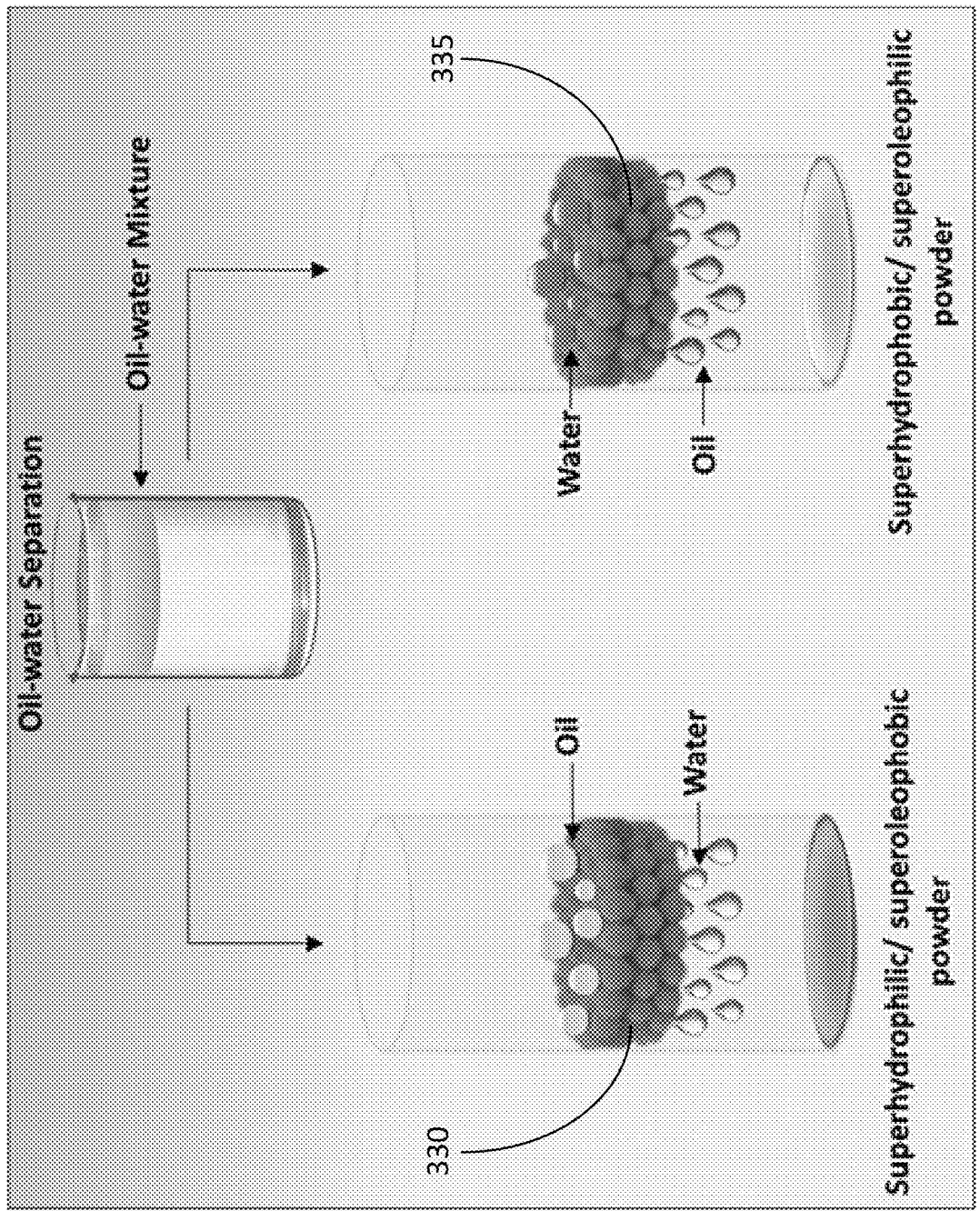
FIG. 3 shows schematically applications of functional nanostructured metallic powders with special wettability in oil-water separation, according to embodiments of the invention.

As a result of the physical and chemical surface modification processes, powder or porous materials demonstrate special wettability toward liquids of different surface energy such as water and oils. In certain embodiments, the materials fabricated have either hydrophobicity (or superhydrophobicity) and oleophilicity (or superoleophilicity), or hydrophilicity (or superhydrophilicity) and oleophobicity (or superoleophoboicity) depending on the low-surface-energy chemicals used in the chemical surface modification step, as shown in FIG. 2B. Overall, the materials can either repel water and absorb oils, or absorb water and repels oils, which can be utilized to separate oils from water (oil-water separation) when a mixture of water and oil poured on the powder/porous material. As an example, FIG. 3 represents how a powder material prepared by the approach is used in oil-water separation. The powder material is either a superhydrophobic/superoleophilic material 330 (left-hand side of the oil-water separation), or a superhydrophilic/superoleophobic material 335 (right-hand side of the oil-water separation).

Certain aspects of the invention also relate to a filter usable for oil-water separation, as shown in FIGS. 14A-14D and 15A-15C. In some embodiments, the filter includes a composite comprising a nanostructured powder or porous material having surfaces with nanoscale features, formed from a pristine powder or porous material by a surface nanostructuring process; and single or multilayers of a low surface energy oligomer or polymer coated on the surfaces of the nanostructured powder or porous material.

In some embodiments, the filter further includes a mesh frame holding the composite.

Certain aspects of the invention also provide an apparatus for oil-water separation, as shown in FIGS. 16SA-16C and 17. In some embodiments, the apparatus comprises the filter as disclosed above; and a vacuum pump in fluid communication with the filter for continuous oil-water separation.

In some embodiments, the filter is re-cyclically usable.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Surface Nanostructuring (Physical Surface Modification):

According to the invention, two methods are used to introduce nanoscale features into the surface of powder or porous materials, as shown in FIG. 2A: hot water treatment (HWT) and steam treatment (ST). Those two methods are both based on the reaction between hot water with the metallic surface of materials to synthesize metal oxide nanostructures without the need to any types of complicated or expensive fabrication conditions/equipment. In the case of HWT, the metal is directly immersed in hot water, while for the ST, steam first condenses on the surface of the metal, forms hot water droplets, and reacts with the metal. Each has its own advantages. Overall, the HWT is a simpler single-step process. On the other hand, the ST can provide temperatures beyond the boiling point of water, enhance the kinetics, and therefore shorten the treatment time. ST can also be more scalable in treating industrial amount and size of materials.

Below is a detailed description on the HWT and ST methods and how metal oxide nanostructures grow on the powder or porous material surfaces. It is followed by a description on two simple surface energy reduction process, solution immersion and oven evaporation, to reduce the surface energy on nanostructured surface.

Figure 4:
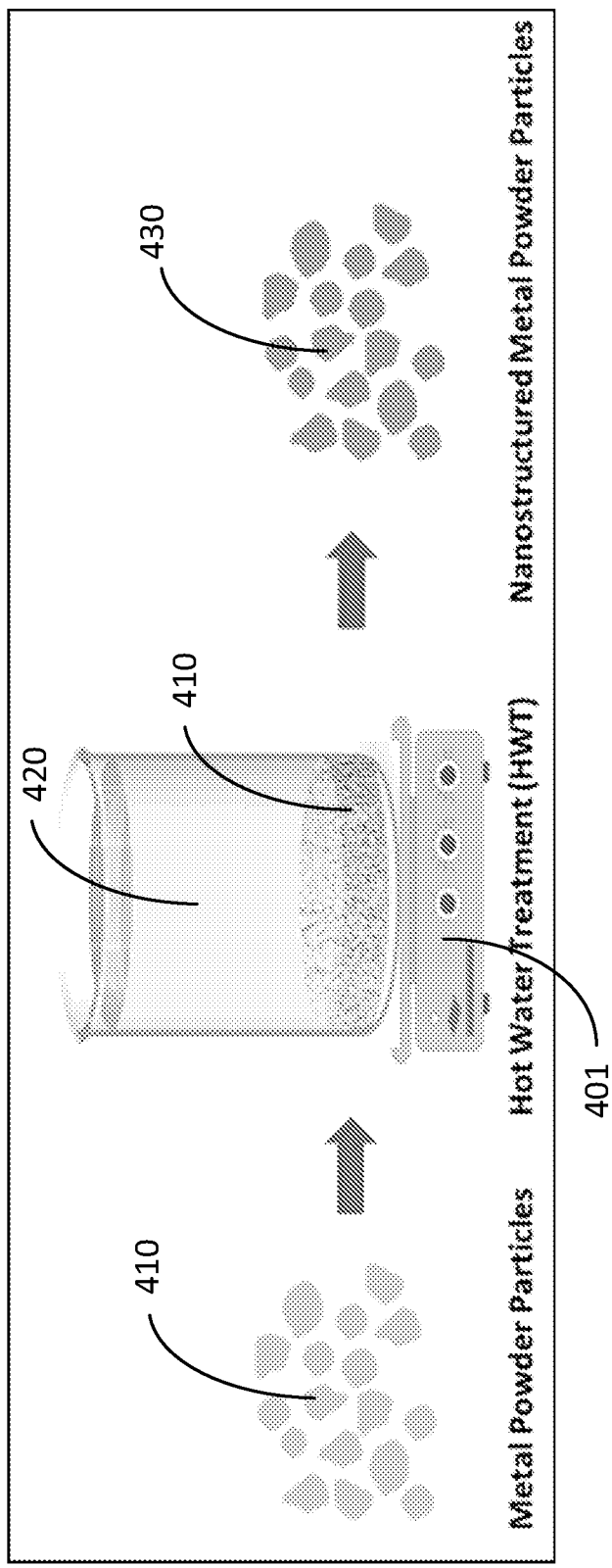
FIG. 4 shows schematically nanostructured metal powder fabrication by hot water treatment (HWT), according to one embodiment of the invention.

Hot Water Treatment (HWT): Referring to FIG. 4, the hot water treatment process is shown according to one embodiment of the invention, which involves a reaction between metal powder particles 410 and water 420, e.g., deionized (DI) water, distilled water, purified water, or any other types of water, at temperatures higher than room temperature, typically between 40-100° C. According to the invention, any types of heating devices, e.g., a range 401, can be used to heat the water 420. The reaction of the hot water 420 and the metal powder particles 410 results in nanostructured metal powder particles 430 having rough metal oxide surfaces with features in the nanoscale (nanostructured metal oxide) approximately in the range of 25-500 nm on the surface of the base metal powder particles 410. Nanostructures formed by the HWT provide significantly rough surfaces compared to a pristine material. Previously, the process has mainly been used to fabricate metal oxide thin films (e.g., MgO, ZnO, CuO, and $Al_2O_3$) [10-13_ENREF_10]. The HWT process is a simple and eco-friendly process, does not involve any chemicals, such as surfactants, reductants, oxidation agents, additives or any byproducts, and also takes place at relativity low temperatures. Since no complicated fabrication processes are involved in the HWT, such as the need for vacuum environment or plasma, the HWT process is low-cost, scalable, and high-throughput.

Figure 5:
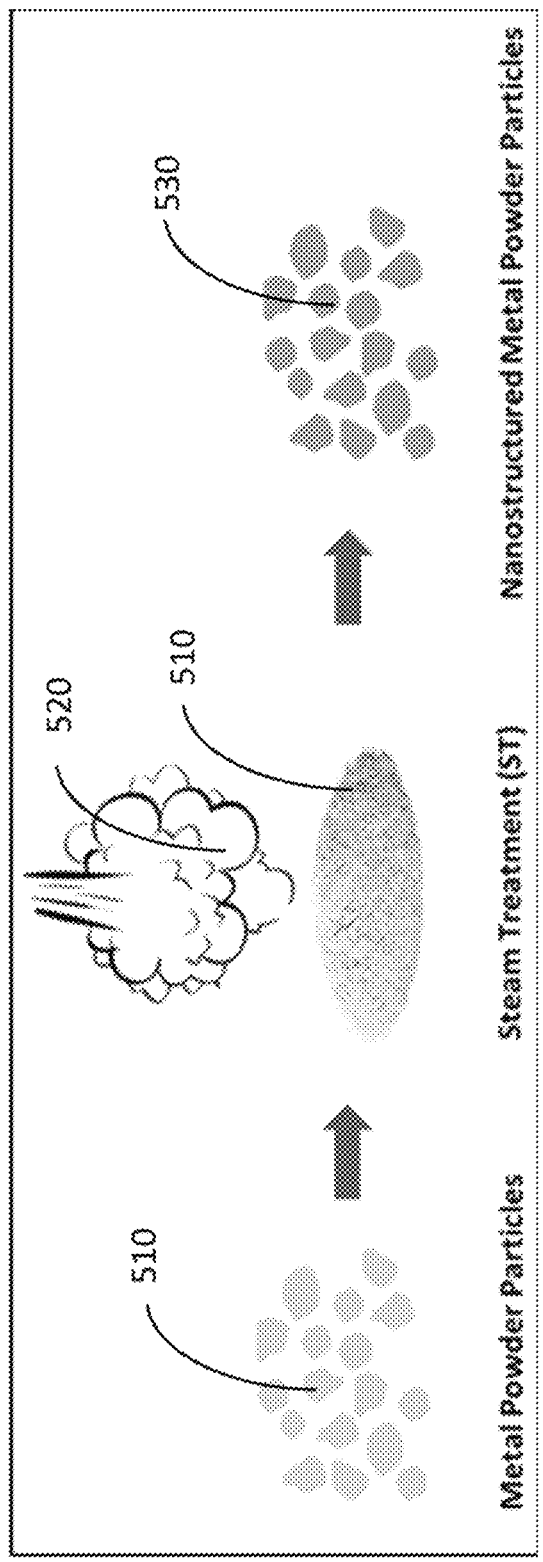
FIG. 5 shows schematically nanostructured metal powder fabrication by steam treatment (ST), according to one embodiment of the invention.

Steam Treatment (ST): As a faster and more scalable alternative to the HWT, steam treatment can effectively form metal oxide nanostructures on surfaces of a powder or porous material, as shown in FIG. 5. In this exemplary embodiment, nanostructured metal powder particles 530 are formed after metal powder particles (powder or porous material) 510 are treated by the steam 520. Different from the HWT, which is limited to the maximum boiling temperature of water, during the ST, water is delivered to the surfaces of the powder or porous material in the form of vapor that can acquire almost any temperature. Higher temperatures of the steam allow much faster nanostructure formation kinetics. Steam also does not require the use of high purity or DI water. Regular tap water can be evaporated to produce a steam that is free from impurities. During the ST, molecular oxygen from the ambient environment is incorporated to the steam that further increases the nanostructure formation kinetics. In addition, the ST allows spatial control on nanostructuring and easy patterning. For example, using a beam of steam coming out of a nozzle, one can do the ST on selected regions of a given metal and form a heterogeneous pattern incorporating untreated metal and ST metal oxide nanostructures. Other than these differences, the ST has all the advantages and similar nanostructure properties of the HWT surfaces described above.

Figure 6:
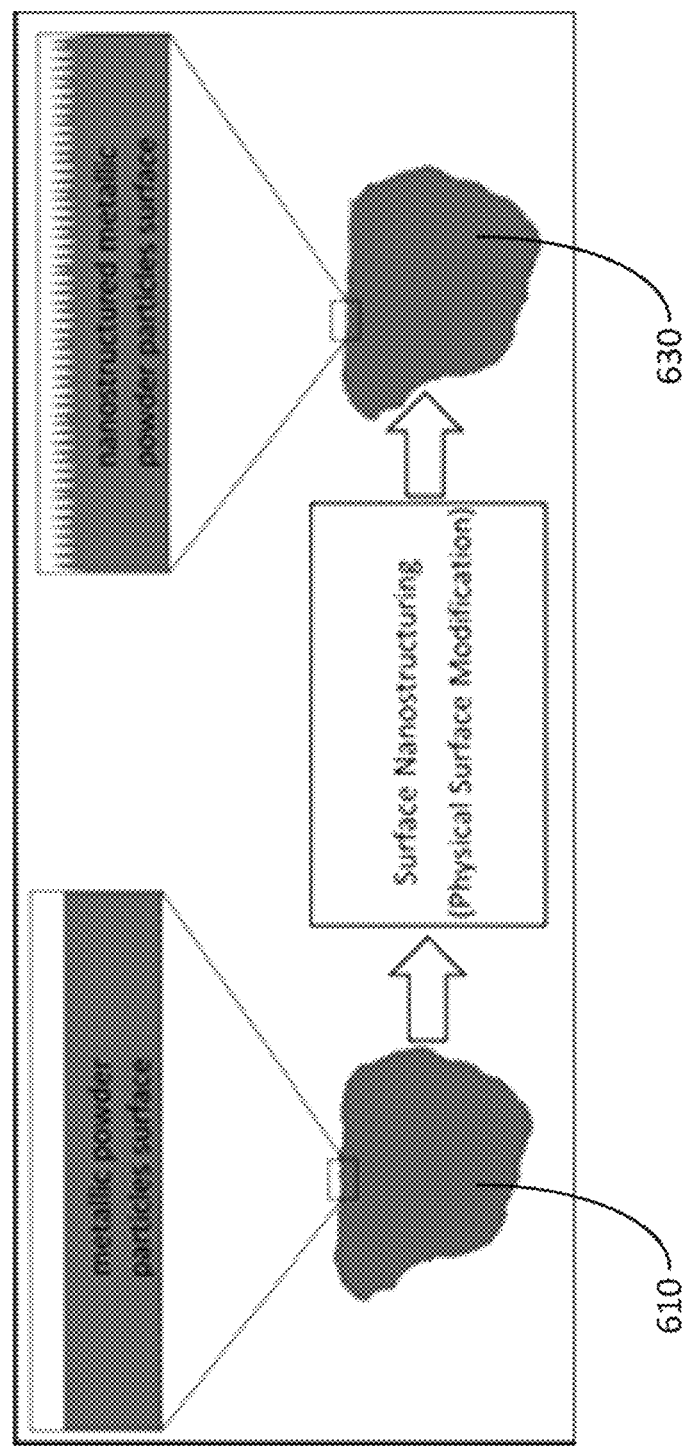
FIG. 6 shows schematically representation of nanostructured metallic powder surface after the HWT or ST surface nanostructuring process, according to one embodiment of the invention.

FIG. 6 is an illustrative representation of a powder, as an example of a powder or porous material according to one embodiment of the invention, and shows the change in its morphology resulting from surface nanostructuring by the HWT or ST process. Compared to the pristine material 610, the particle 630 treated with hot water (HWT or ST) has a rough surface including nanoscale features. The nanoscale roughness is a very essential for a surface to acquire the special wettability after a surface energy reduction step. The HWT and ST, as a method to produce nanoscale features, are a very good fit for roughening materials surface to produce oil/water separator materials as they are very simple and facile processes.

Figure 7:
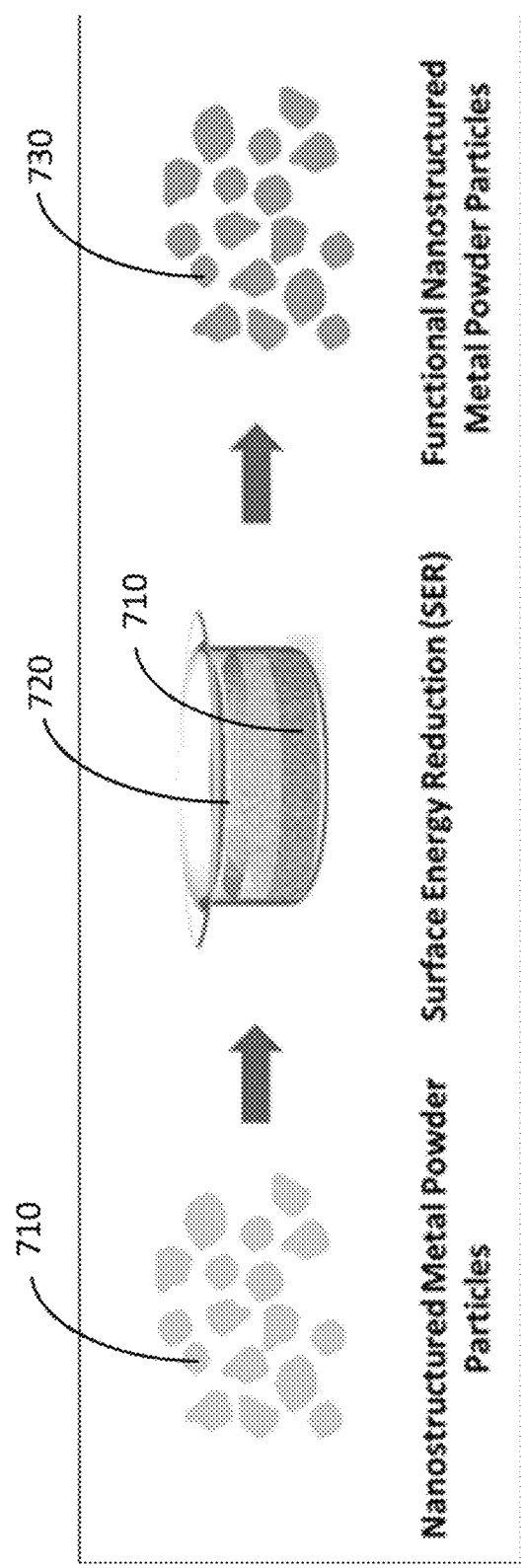
FIG. 7 shows schematically a surface energy reduction process of the nanostructure metal powders by coating the powder surface with a low-surface-energy chemical using liquid immersion method, according to one embodiment of the invention.
Figure 8:
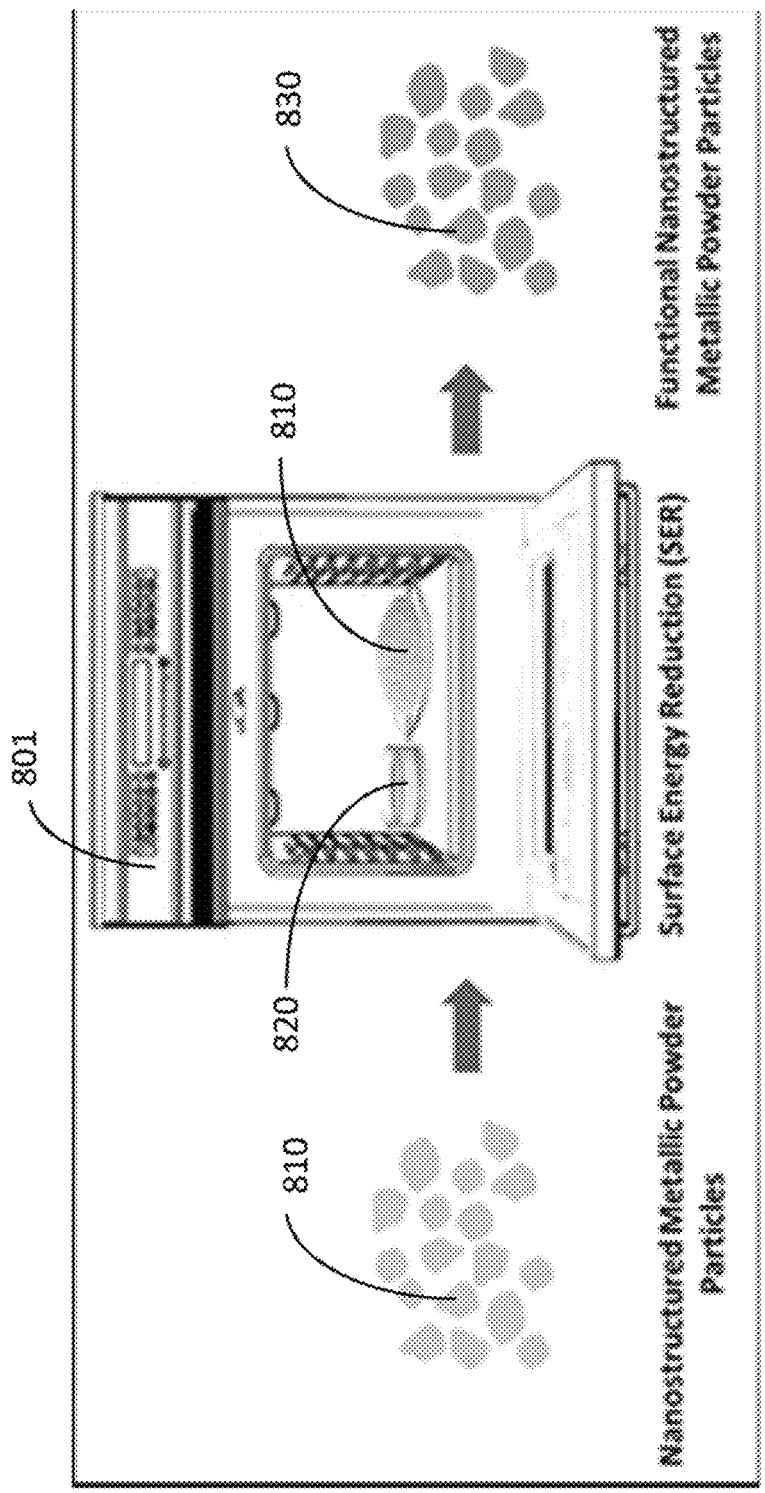
FIG. 8 shows schematically a surface energy reduction process of the nanostructure metal powders by coating the powder surface with a low-surface-energy chemical using oven evaporation, according to one embodiment of the invention.

Surface Energy Reduction (Chemical Surface Modification):

In certain embodiments, chemical surface modification approaches such as introducing thin or thick layers, single or multilayers of low surface energy oligomers/polymers on a base material using liquid or vapor coating techniques are used to reduce the surface energy of powders or porous materials and achieve the special wettability property. Reducing the surface energy of a surface is the key factor in fabricating materials with special wettability for oil/water separation. The surface should have a surface energy lower than water and higher than oils in order to separate the water and old from an oil/water mixture. According to the invention, very simple chemical surface modification techniques are used to coat the surface of materials with a single thin layer of low surface energy chemicals. FIGS. 7 and 8 schematically show two approaches of the chemical surface modification: solution immersion and oven evaporation, respectively, to coat the surface of materials with a single thin layer of low surface energy chemicals. In the approach of the solution immersion, as shown in FIG. 7, the nanostructured metal powder particles 710 is immersed in a solution 720 of a low-surface-energy chemical and functional nanostructured metal powder particles 730 are then formed by coating the powder surface with the low-surface-energy chemical. The resulted have special wettability. FIG. 8 shows a schematic of the oven evaporation approach to coat the surface of materials with a single thin layer of low surface energy chemicals, where the nanostructured metal powder particles 810 and a solution 820 of a low-surface-energy chemical are disposed in an oven 801, and are heated therein to evaporate the low-surface-energy chemical solution 820. The evaporation of the low-surface-energy chemical condenses on the surfaces of the nanostructured metal powder particles 810 to form functional nanostructured powder particles 830 with special wettability. It should be appreciated that a porous material such as mesh or foam can also be used to practice the invention.

Furthermore, other surface energy reduction methods can also be used to coat the surfaces of powder or porous materials with a single thin layer of low surface energy chemicals with special wettability. As an example illustrated in FIG. 9, nanostructured metallic powder particles 910 are chemically modified to obtain functional nanostructured powder particles 930 having a lower surface energy by being coated with a self-assembled monolayer (SAM) polymer 930 that leads to change in their surface wettability toward different liquids. For metallic powder with special wettability, reducing their surface energy can bring the surface to become hydrophobic (or superhydrophobic) and oleophilic (or superoleophilic).

Results and Discussions:

In certain aspects of the invention, the simple nanostructure synthesis techniques (hot water treatment, steam treatment) and surface energy reduction methods (solution immersion, oven evaporation) are used to generate powder or porous materials with special wettability for oil-water separation applications. All the methods described above are facile, low-cost, scalable, and eco-friendly. As an example, metallic powder was chosen to demonstrate the physical and chemical surface changes involved and its special wettability toward water and oil. Certain aspects of the invention also relate to an oil-water separation apparatus comprising the functionalized powder or porous materials.

In certain embodiments, nanostructuring powder or porous materials are formed by the HWT or ST. During these hot water processes, surfaces of a given powder or porous metallic material react with water at temperatures higher than room temperature (typically >50° C.) to form nanostructured metal oxides [10, 11, 14-18]. In order to introduce a nanostructured layer onto a metal powder surface, potential contamination on the powder surfaces is removed by ultrasonicating the powders first with acetone, isopropanol, and DI water each for about 5 min, and then dried. For the HWT, cleaned metal powders are then immersed in hot DI water as shown in FIG. 4. Treatment time may vary depending on the metal; basically it ranges between a few minutes up to several hours or days. In some embodiments, the morphology of the nanostructured layer on a metal powder can be tuned by varying the immersion time (from a few minutes up to several hours or days). FIGS. 10A-10H show the scanning electron microscopy (SEM)

images of aluminum (FIGS. 10A-10B), magnesium (FIGS. 10C-10D), zinc (FIGS. 10E-10F), and copper (FIGS. 10G-10H) metal powder surfaces before (FIGS. 10A, 10C, 10E and 10G) and after (FIGS. 10B, 10D, 10F and 10H) the HWT at 75° C. The SEM images show the formation of nanoscale features (nanostructured metal oxide) on the respected metal powder after the HWT, which does not exist before the HWT process. All powder surfaces show the formation of nanoscale features and distributed uniformly on metal powder surfaces, such as aluminum oxide nanograss on Al powders, zinc oxide nanowires on Zn powders, and nanoplates for Cu in a plate-like shape in the scale of a few of nanometers.

Figure 11:
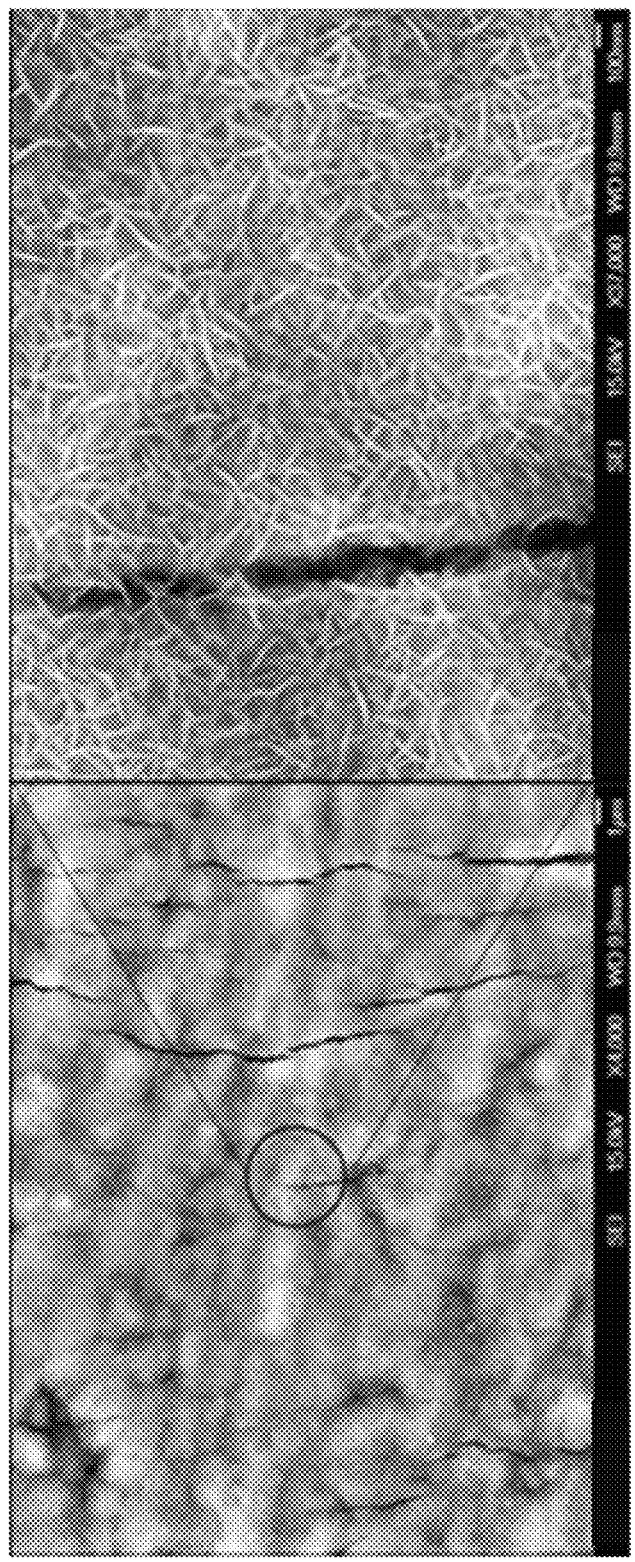
FIG. 11 shows growth of aluminum oxide nanostructures on Al surface after 10 min of ST, according to one embodiment of the invention. Al has been chosen as an example base metal; and nanostructure formation by the ST can apply to a wide variety of metallic materials.

As illustrated in FIG. 5, for the ST, similar to the HWT approach, when clean metal powder surfaces are exposed to water steam (vapor) for a certain time period (depending on the type of metals), metal powder surfaces react with gaseous water molecules and oxidize the surfaces. The oxidized metal ions redeposit on metal surfaces again by migration through condensed hot water and form metal oxide nanostructures. Sizes of ST-nanostructures can vary from few tens of nanometers up to several hundreds of nanometers, as shown in FIG. 11. Because this process involves the reaction between water vapor and the metal powder surfaces, the ST process takes place in a much faster when compared to the HWT, since water vapor can reach to much higher temperatures compared to hot liquid water (i.e., limited to boiling temperature) and thus the kinetics of metal oxide nanostructure growth becomes enhanced.

In certain embodiments, to obtain metal powders of special wettability, nanostructured powders were coated with low surface energy materials using self-assembled monolayer (SAM) polymer. In one embodiment, HWT-powders were dispersed in 20 ml hexane, and 0.01 g of 1H, 1H, 2H, 2H-perfluorodecyltrichlorosilane (FDTS) or 10 mM of 1-Dodecanethiol (DDT), as illustrated in FIG. 7. The solution was gently stirred at ambient temperature for a set period of time depending on the metal used. The powder was then dried overnight at the ambient environment to obtain the functional metal powder particles. As shown in FIG. 12B, when the powders are poured on water, the functional metal powders floated on the water surface without sinking due to its strong water-repelling property (superhydrophobic). On the other hand, as shown in FIG. 12A, the pristine HWT-nanostructured metal powders (without chemical treatment) sank underwater because of its strong water-attracting property (superhydrophilic). When a mixture of HWT-Al powder and functional one were mixed with water, after slight stirring the HWT-Al powders sank under water and the functional one remained on the water surface, as shown in FIG. 12C. Similar to Al, other metal powders (Cu, Zn, Mg, etc.) also showed superhydrophilic property after the HWT and superhydrophobic property for the functional HWT-powder after the chemical treatment.

In some embodiments, a small droplet of water with a volume of 10 µL appears to be a sphere on the superhydrophobic Cu (FIG. 13A) and Mg (FIG. 13B) functional powder surfaces. Among various droplets of water and oils, cyclohexane (dyed with oil red O) and petroleum hydrocarbons, of about 10 µL placed on functional Al (FIG. 13C) and Zn (FIG. 13D) powders, the water droplet still have a sphere shape. On the other hand, oil droplets were absorbed by the powder materials. These results indicate the special wettability of functional metal powder having superhydrophobic and superoleophilic behavior. In all the functional powder materials tested, a bright, reflectively visible surface underneath the water droplet at the water-powder interface is observed, which indicates the existence of trapped air and the formation of a composite solid-liquid-air interface that enhance the hydrophobicity of a surface toward water.

For a quantitative surface wettability analysis, a sessile drop method was used to measure the contact angles (CAs) of water and oils on our powder materials. 5 µL of water and oil were placed on a flattened functional HWT-powder and CA was measured on five different positions on the surface. The average of contact angle values for water and different oils are listed in Table 1. As discussed before, the formation of composite solid-liquid-air interface enhances the surface super-repellence toward water. A high water contact angle (WCA) of about 163° was achieved on functional HWT-Cu-powders. WCAs for other materials were also high with about 158°, 157°, and 151° for Zn, Al, and Mg functional HWT-powders, respectively. On the contrary, the petroleum hydrocarbons and cyclohexane droplet can wet the superhydrophobic surface completely and spread out the surface immediately, within the time of 0.5 s, as shown in FIGS. 13C and 13D for Al and Zn. In other words, their oil contact angles (OCAs) can be assumed to be about 0°, which indicates the desired superhydrophobic/superoleophilic special wetting property for oil-water separation applications. For functional HWT-Mg-powder, OCA was about 18° for cyclohexane (died with red) and 22° for petroleum hydrocarbons, which still provides a special wetting property of superhydrophobic/oleophilic behavior.

TABLE 1

Contact angle of water and oils on functional HWT-powders.

| Liquid | Functional HWT-Powder Contact Angle (Degrees) | | | |
| --- | --- | --- | --- | --- |
|  | Cu | Zn | Al | Mg |
| Water | 163 | 158 | 157 | 151 |
| Cyclohexane | 0 | 0 | 0 | 18 |
| Petroleum hydrocarbons | 0 | 0 | 0 | 22 |

With the special wettability of the functional HWT-powder surface, superhydrophobic and superoleophilic properties simultaneously, it becomes an ideal candidate for removing oil from water in an oil-water mixture. Oil gets absorbed instantaneously when it is brought into contact with a functional HWT-powder surface, while water remains on the surface resulting in a separating process. More importantly, all the oil absorbed in the powders can be easily and very quickly removed by rinsing the oil-saturated powder with acetone and can be reused for oil-water separation several times.

In one aspect, the invention relates to an oil-water separation filter/apparatus. In one embodiment shown in FIGS. 14-14D, module (FIG. 14A) including the 2.5 g of functional HWT-Al powders and cotton fixed into a funnel end, is used to separate a cyclohexane-water mixture. As shown in FIG. 14B, when the mixture of tap water solution and cyclohexane (25 ml, dyed with oil red O) (FIG. 14D) was poured onto the funnel filter, the cyclohexane was absorbed by the powders, penetrated the filter, and flowed down the beaker beneath (FIG. 14C); whereas, the tap water retained on the surface of the metal powders (FIG. 14B). In another embodiment, an identical filter module was used for separation of tap water (water was dyed with methylene blue) and 25 ml of petroleum hydrocarbons. As shown in FIG. 15B, the apparatus worked successfully, where water remained on the surface of the metal powder (FIG. 15A) and all the oil got absorbed by the powders and collected in the beaker underneath the filter (FIG. 15C).

Figure 17:
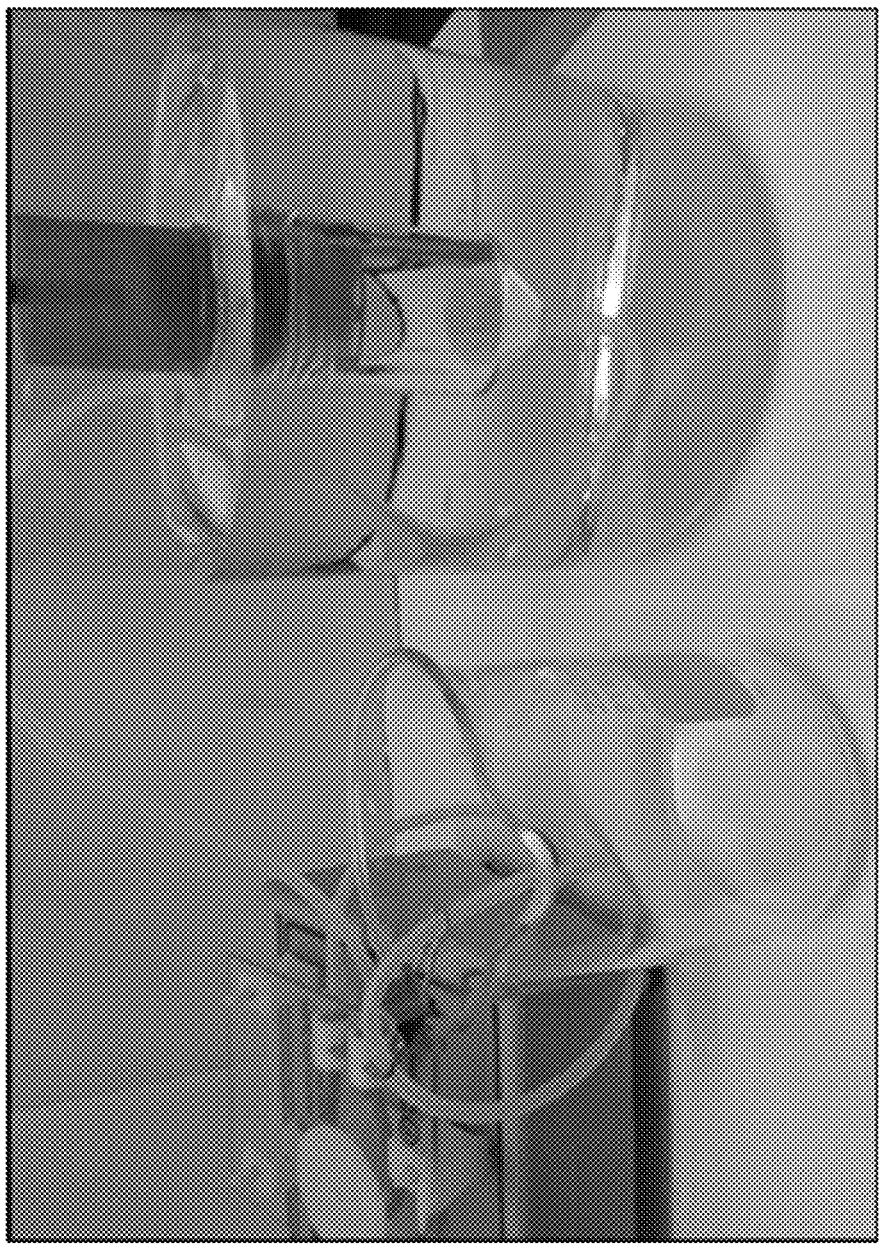
FIG. 17 shows an apparatus equipped with a vacuum pump used for continuous oil-water separation, according to one embodiment of the invention. The separation module (cartridge filter) was place into the oil-water mixture.

Afterwards, another filter design was used for continuous oil-water separation and handling larger quantities of oil-water mixture. FIG. 16A show a prototype cartridge filter module built using pristine Cu mesh to hold the functional HWT-powders in a cylindrical shape, a reservoir to collect the separated oil, and a vacuum pump to pump the oil out (FIG. 17). In one embodiment, about 100 gm of the functional HWT-Zn powders placed into the filter cartridge and placed in a 1000 ml of tap water such that half of the cartridge powders were in contact with water. Then, 100 ml of cyclohexane (dyed with oil red O) was poured onto the beaker to get the oil-water mixture for separation. The Cu mesh has a hydrophobic and oleophilic property and the functional HWT-Zn-powder had a superhydrophobic and superoleophilic surface property, which absorbs the oil very quickly while not letting the water in. When the oil was poured into the tap water beaker, the oil quickly began to be absorbed by the powder with the help of vacuum pump. The total time for separation of the oil-water mixture was merely about 1 min. No water was observed in the collected oil.

The separation efficiency of the prototype filter toward cyclohexane and petroleum hydrocarbons is shown in FIG. 18A. The separation efficiency toward the cyclohexane-water was close to 100%, while efficiency of petroleum hydrocarbons-water mixture was about 99.5%, as shown in FIG. 18A. The total time for separation of the oil-water mixtures was about 5 min for the first simple filtering module. Therefore, a vacuum pump system is needed to speed up the filtration process time in order to expand the application of using the functional HWT-powders in the field of oil-water separation.

Furthermore, the filtration process was applied to the filter many successive cycles. It was observed that the filter can maintain its high separation efficiency even after 200 cycles of oil-water separation, as shown in FIG. 18B. Importantly, the filter can retain its high separation efficiency regards the continuous separation. FIG. 18C shows the filter performance for different time periods of continuous oil-water separation. The results show the ability of the filter to do separation after 120 min of continuous separation with very high efficiency. Also the filter durability was tested by performing a complete filtration after several days. As shown in FIG. 18C, the filter remains its high separation efficiency even after 45 days from the first time of use. These proof-of-concept results indicate that functional powder/porous materials of this invention that have special wettability can be good candidates in several oil-water separation applications such as the treatment of oil-polluted water and oil-spill cleanup.

Alternatives for Surface Nanostructuring (Physical Surface Modification): Water is the main element in physical surface modification methods of the HWT and ST, either of which can be used to achieve the surface nanostructuring of materials according to the invention. In a typical HWT or ST process, water with high resistivity, low conductivity, and high purity is preferred. However, water of poorer qualities of these properties such as tap water, mineral water, or even water from lakes, rivers, and sea as an alternative can also be used for both the HWT and ST and can further lower the fabrication costs of nanostructuring step.

In addition, the kinetics of hot water process and therefore nanostructure growth rates can be enhanced by incorporating tools/conditions that further enhance the effective temperature of the base porous/powder material. For example, microwave (e.g., microwave-assisted HWT), high pressure (HWT in a high pressure container), and infrared light heating (IR-assisted ST or HWT) can be utilized during the hot water process according to the invention.

Alternatives for Surface Energy Reduction (Chemical Surface Modification): Solution immersion and oven evaporation are the processes utilized in this invention to reduce the surface energy of nanostructured materials. Several other surface energy reduction methods can also be used for chemical surface modification after the physical surface modification step of this invention to fabricate materials with special wettability as described above. In general, thin film deposition methods such chemical vapor deposition (CVD) or physical vapor deposition (PVD) can be used as alternative to solution immersion and oven evaporation processes. Pulsed laser deposition, evaporative deposition, sputter deposition are some examples of PVD. Aerosol-assisted CVD, plasma enhanced CVD (PECVD), atomic layer deposition (ALD) are some examples of CVD methods.

In addition, any chemicals that have low-energy functional group or can lead to a surface of lower energy can be used in this invention.

Hybrid Physical-Chemical Surface Modifications: In certain embodiments, powder nanostructures produced by the HWT or ST can be coated with low surface-energy chemicals, and deposited on the surface of porous base material by methods such as spray coating, paintbrush, or spin coating.

Alternative Base Materials: Metallic powder/porous materials of this invention, such as materials made of pure elemental metals, alloys, and compounds are the best candidate materials that can directly acquire a nanostructured surface as described above. In addition, any other compositions made by combination of them with other non-metallic materials can also be used to form a nanostructured surface.

As another alternative, any type of powder/porous material including insulators, conductors, semiconductors can be coated with nanostructures of the HWT or ST process through a cross-deposition mechanism. For example, a non-metallic porous material can be places across a metal plate during the HWT or ST. The molecules that migrate through water and deposit on metal substrate to form nanostructures can also deposit on the neighboring non-metallic porous material and can form a layer of HWT-nanostructures.

Surface Activation Methods: In certain embodiments, nanostructure formation kinetics can be enhanced by activating the surface with pretreatment methods such as acid dipping (e.g., HF, HCL, $HNO_3$, and so on) or plasma exposure. Chemically modified metallic surfaces can incorporate higher number of metal ions that can speed up the fabrication process.

Briefly, aspects of the invention relates to a composite for oil-water separation, synthesis methods and applications of the same, which have, among other things, the following key features.

Oil-water separation can be performed by powder or porous materials with nanostructured metal oxide surface that is synthesized by a simple, low-cost, scalable, fast, and environment-friendly hot water process.

Hot water process can produce a nanostructured metal oxide surface on the base porous/powder material for physical surface modification, which is followed by almost any type of chemical surface modification in order to reduce the surface energy of the nanostructured surface, and therefore leading to a special wetting property for oil-water separation applications.

Special wettability of the surfaces produced by hot water process and chemical surface modification can include surfaces that can repel water (hydrophobic or superhydrophobic) and absorb oils (oleophilic or superoleophilic), or materials that can repel oils (oleophobic or superoleophobic) and absorb water (hydrophilic or superhydrophilic).

Hot water process can be in the form of hot water treatment (HWT) that produces a nanostructured surface on the base porous/powder material, nanostructured surface can be chemically modified by methods including solution immersion and oven immersion, which at the end leads to powder/porous materials with special wettability for oil-water separation applications.

Hot water process can be in the form of steam treatment (ST) that produces a nanostructured surface on the base porous/powder material, nanostructured surface can be chemically modified by methods including solution immersion and oven immersion, which at the end leads to powder/porous materials with special wettability for oil-water separation applications.

Hot water process can be assisted with other tools/conditions, including microwave (e.g., microwave-assisted HWT), high pressure (HWT in a high pressure container), and infrared light heating (IR-assisted ST or HWT), in order to enhance kinetics/thermodynamics of the nanostructuring mechanisms on the base porous/powder material, nanostructured surface can be chemically modified by methods including solution immersion and oven immersion, which at the end leads to powder/porous materials with special wettability for oil-water separation applications.

Hot water process can use a wide variety of water including DI water and purified water, as well as water of poorer quality but lower cost including tap water, mineral water, or even water from lakes, rivers, and sea as alternatives, which further lower the fabrication costs of nanostructuring step of this invention.

Surface energy reduction of the nanostructured surface produced by hot water process can be achieved by a wide variety of chemical energy modification methods including liquid immersion, oven evaporation, microwave evaporation, and also thin film deposition methods such chemical vapor deposition (CVD) or physical vapor deposition (PVD).

Powder nanostructures produced by hot water process can be coated with low surface-energy chemicals, and deposited on the surface of porous/powder base material by methods such as spray coating, paintbrush, or spin coating, which can directly provide surfaces of special wettability for oil-water separation.

Powder/porous base materials to be used for hot water process and oil-water separation can be made of a wide range of materials including pure elemental metals, alloys, compounds, combination of these with non-metallic materials, which can also be used to form a nanostructured surface.

As another alternative, any type of powder/porous material including insulators, conductors, semiconductors can be coated with nanostructures of hot water process through a cross-deposition mechanism. For example, a non-metallic porous material can be places across a metal plate during HWT. The molecules that migrate through water and deposit on metal substrate to form nanostructures can also deposit on the neighboring non-metallic porous material and can form a layer of HWT-nanostructures.

Hot water process is applicable to almost any 3D material such as powder, pipe, mesh, or foam that can be used for oil-water separation applications.

A hot-water-process-nanostructured or pristine powder material can be compressed by a variety of mechanical/sintering processes (such as hot/cold press, metal printers, and direct metal laser sintering) into different porous shapes and geometries (such as disk, foam, etc. . . . ) which can be used in producing the oil-water separator of this invention.

Nanostructure formation kinetics during hot water process can be further enhanced by activating the surface with pretreatment methods such as acid dipping (e.g. HF, HCL, and $HNO_3$) or plasma exposure.

Fabricated powder/porous materials with special wettability using the methods involved in this invention can be used to remove all deferent types of liquids having surface energy higher than that of water, including oils such mineral oils and organic oils.

Fabricated powder/porous materials with special wettability using the methods involved in this invention can be incorporated into a wide variety of oil-water separation systems, including filtration systems as filling materials in a cartridge unit or tubular piping.

Fabricated powder/porous materials with special wettability using the methods involved in this invention can be used in other non-filtering methods of oil-water separation such as powder to adsorb/absorb oils directly from the surface of contaminated water.

Powder/porous materials used for oil-water separation can be cleaned by a variety of physical and chemical methods and can be used again for oil-water separation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCE LIST

[1]. Song, B., Simple and fast fabrication of superhydrophobic metal wire mesh for efficiently gravity-driven oil/water separation. Marine Pollution Bulletin, 2016. 113(1-2): p. 211-215.

[2]. Wang, J., et al., Facile Preparation of Nanostructured, Superhydrophobic Filter Paper for Efficient Water/Oil Separation. PLoS ONE, 2016. 11(3): p . . . e0151439.

[3]. Gao, X., et al., Flexible Superhydrophobic and Superoleophilic MoS2 Sponge for Highly Efficient Oil-Water Separation. Scientific Reports, 2016. 6: p. 27207.

[4]. Ge, B., et al., One-step foaming method to functional polyurethane absorbents foam. Separation Science and Technology, 2016. 51(8): p. 1299-1306.
[5]. Preparation method of super-hydrophobic magnetic powder. 2011, Chinese Pub No. CN102728275A.
[6]. Super-hydrophobic and super-oleophylic oil-water separating mesh membrane and preparation method thereof 2013, Chinese Pub No. CN102961893A.
[7]. Preparation method of super-oleophylic and super-hydrophobic oil-water separation membrane. 2015, Chinese Pub No CN1721030A.
[8]. Chiu, G. and A. Yu, Hydrophobic and oleophilic sponge-like compositions. 2015, US Pub No, US20150194667A1.
[9]. Wang, D. and X. LIU, Substrates for oil and water separation. 2015, PCT Pub No. WO2015160888A1.
[10]. Saifaldeen, Z. S., et al., Superamphiphobic aluminum alloy surfaces with micro and nanoscale hierarchical roughness produced by a simple and environmentally friendly technique. Journal of Materials Science, 2013. 49(4): p. 1839-1853.
[11]. Khedir, K. R., et al., Robust Superamphiphobic Nanoscale Copper Sheet Surfaces Produced by a Simple and Environmentally Friendly Technique. Advanced Engineering Materials, 2014. 17(7): p. 982-989.
[12]. Khedir R Khedir, Z. S. S., Taha Demirkan, Rosure B. Abdulrahman, and Tansel Karabacak, Growth of ZnO Nanorod and Nanoflower Structures by Facile Treatment of Zinc Thin Films in Boiling De-Ionized Water, Journal of Nanoscaince and Nanotechnology, 2017 17 (7): p. 4842-4850
[13]. Saifaldeen, Z. S., et al., The effect of polar end of long-chain fluorocarbon oligomers in promoting the superamphiphobic property over multi-scale rough Al alloy surfaces. Applied Surface Science, 2016. 379: p. 55-65.
[14]. Krengvirat, W., et al., Low-temperature crystallization of TiO2 nanotube arrays via hot water treatment and their photocatalytic properties under visible-light irradiation. Materials Chemistry and Physics, 2013. 137(3): p. 991-998.
[15]. Matsuda, A., et al., Preparation of Titania Nanosheet-Precipitated Coatings on Glass Substrates by Treating SiO 2-TiO 2 Gel Films with Hot Water Under Vibrations. Journal of Sol-Gel Science and Technology, 2004. 31(1-3): p. 229-233.
[16]. Shanmugan, S. and D. Mutharasu, Synthesis of In2O3 Thin Films from Indium Thin Film by Hot-Water Oxidation Method. Metallurgical and Materials Transactions A, 2011. 43(1): p. 6-9.
[17]. Shanmugan, S., D. Mutharasu, and I. Kamarulazizi, Synthesis and Properties of Nano Structured SnO2 Thin Films Prepared by Hot Water Oxidation of Metallic Sn Thin Film. Materials Focus, 2014. 3(1): p. 48-54.
[18]. Tan, W. K., et al., Formation of highly crystallized ZnO nanostructures by hot-water treatment of etched Zn foils. Materials Letters, 2013. 91: p. 111-114.

What is claimed is:

1. A method of synthesizing a composite usable for oil-water separation, comprising:
surface nanostructuring pristine powders to form nanostructured powders having surfaces with nanoscale features; and
coating single or multilayers of one or more low surface energy oligomers, polymers, or their composites with other materials on the surfaces of the nanostructured powders,
wherein the surface nanostructuring process comprises a hot water treatment (HWT) of the pristine powders, wherein the HWT is performed with the assistance of microwave, infrared light heating, and/or in a high pressure container; and
wherein the surface nanostructuring process comprises growing the nanoscale features on the surfaces of the pristine powders through a cross-deposition mechanism during the HWT.

2. The method of claim 1, wherein the pristine powders comprise a metal, an alloy, a metal oxide, a compound of metals with non-metallic materials, a non-metallic material, an insulator, a conductor, a semiconductor, or a combination thereof.

3. The method of claim 1, wherein the low surface energy oligomer or polymer has a surface energy lower than that of water and higher than that of oil.

4. The method of claim 3, wherein the composite is hydrophobic or superhydrophobic, and oleophilic or superoleophilic, wherein the composite operably repels water and absorbs oil.

5. The method of claim 1, wherein the low surface energy oligomer or polymer has a surface energy lower than that of oil and higher than that of water.

6. The method of claim 5, wherein the composite is oleophobic or superoleophobic, and hydrophilic or superhydrophilic, wherein the composite operably repels oil and absorbs water.

7. The method of claim 1, wherein the HWT comprises:
mixing the pristine powders in water to form a mixture thereof; and
heating the mixture at temperatures higher than room temperature for a period of time to form the nanostructured powders having the surfaces with nanoscale features.

8. The method of claim 1, wherein the cross-deposition mechanism comprises placing the pristine powders of non-metallic powders across a metal substrate during HWT, wherein molecules that migrate through water and deposit on the metal substrate to form nanostructures deposit on the neighboring non-metallic powders and form a layer of HWT-nanostructures.

9. The method of claim 1, wherein the coating process is performed by a surface energy reduction process including solution immersion and oven evaporation.

10. The method of claim 1, wherein the coating process is performed by pulsed laser deposition, evaporative deposition, sputter deposition, spray coating, paintbrush, or spin coating.

11. The method of claim 1, further comprising, prior to the surface nanostructuring process, a pretreatment process to activate the surface of the pristine powders, wherein the pretreatment process includes acid dipping or plasma exposure.

12. A method of synthesizing a composite usable for oil-water separation, comprising:
surface nanostructuring a pristine powder or porous material to form nanostructured powder or porous material having surfaces with nanoscale features; and
coating single or multilayers of a self-assembled monolayer (SAM) polymer on the surfaces of the nanostructured powder or porous material, wherein the SAM polymer is 1H, 1H, 2H, 2H-perfluorodecyltrichlorosilane (FDTS) or 1-Dodecanethiol (DDT),
wherein the surface nanostructuring process comprises a hot water treatment (HWT) of the pristine powders, wherein the HWT is performed with the assistance of microwave, infrared light heating, and/or in a high pressure container, and wherein the surface nanostructuring process comprises growing the nanoscale features on the surfaces of the pristine powder or porous material through a cross-deposition mechanism during the HWT.

13. The method of claim 12, wherein the pristine powder or porous material comprises a metal, an alloy, a metal oxide, a compound of metals with non-metallic materials, a non-metallic material, an insulator, a conductor, a semiconductor, or a combination thereof.

* * * * *